United States Patent
Wong et al.

(10) Patent No.: US 11,126,384 B2
(45) Date of Patent: Sep. 21, 2021

(54) REMOVABLY COUPLABLE PRINTER AND VERIFIER ASSEMBLY

(71) Applicant: Datamax-O'Neil Corporation, Altamonte Springs, FL (US)

(72) Inventors: Chin Young Wong, Singapore (SG); Thomas Axel Jonas Celinder, Singapore (SG); Sébastien Michel Marie Joseph d'Armancourt, Singapore (SG)

(73) Assignee: DATAMAX-O'NEIL CORPORATION, Altamonte Springs, FL (US)

( * ) Notice: Subject to any disclaimer, the term of this patent is extended or adjusted under 35 U.S.C. 154(b) by 0 days.

(21) Appl. No.: 17/025,504

(22) Filed: Sep. 18, 2020

(65) Prior Publication Data
US 2021/0004185 A1    Jan. 7, 2021

Related U.S. Application Data

(63) Continuation of application No. 15/880,723, filed on Jan. 26, 2018, now Pat. No. 10,809,949.

(51) Int. Cl.
*G06F 3/12* (2006.01)

(52) U.S. Cl.
CPC .......... *G06F 3/1221* (2013.01); *G06F 3/1236* (2013.01); *G06F 3/1292* (2013.01)

(58) Field of Classification Search
CPC .................................................... G06F 3/1236
USPC ......................................................... 400/692
See application file for complete search history.

(56) References Cited

U.S. PATENT DOCUMENTS

| | | | |
|---|---|---|---|
| 4,492,355 A * | 1/1985 | Bylin | B65G 69/20 211/DIG. 1 |
| 5,198,650 A | 3/1993 | Wike, Jr. | |
| 5,209,583 A | 5/1993 | Lewis et al. | |
| 5,513,922 A * | 5/1996 | Umbach | B41J 3/46 347/222 |
| 6,042,279 A | 3/2000 | Ackley | |
| 6,612,763 B1 | 9/2003 | Yoshihara | |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |

(Continued)

FOREIGN PATENT DOCUMENTS

WO    2013/163789 A1    11/2013

OTHER PUBLICATIONS

Notice of Allowance and Fees Due (PTOL-85) dated Aug. 7, 2020 for U.S. Appl. No. 15/880,723.

(Continued)

*Primary Examiner* — Anthony H Nguyen
(74) *Attorney, Agent, or Firm* — Alston & Bird LLP

(57) ABSTRACT

A verifier and printer assembly are provided. The verifier and printer assembly include a verifier module and a printer. The verifier has a magnetic docking element and the printer includes a docking portion operable to dock the verifier module. The magnetic docking element and the docking portion interact with each other to removably couple the verifier module to the printer. A magnetic attachment system for the verifier module and methods for removably coupling the verifier module and the printer for verification of a printed machine-readable symbol are also provided.

20 Claims, 17 Drawing Sheets

(56) References Cited

U.S. PATENT DOCUMENTS

| | | | |
|---|---|---|---|
| 7,413,127 B2 | 8/2008 | Ehrhart et al. | |
| 7,556,564 B2* | 7/2009 | Silverbrook | B41J 3/445 |
| | | | 463/39 |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Van et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein, Jr. | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,632,266 B1* | 1/2014 | Simmons | B41J 29/393 |
| | | | 400/76 |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre, Jr. | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz, Sr. | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue et al. | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein, Jr. | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |
| 8,915,439 B2 | 12/2014 | Feng et al. | |
| 8,915,444 B2 | 12/2014 | Havens et al. | |
| 8,916,789 B2 | 12/2014 | Woodburn | |
| 8,918,250 B2 | 12/2014 | Hollifield | |
| 8,918,564 B2 | 12/2014 | Caballero | |
| 8,925,818 B2 | 1/2015 | Kosecki et al. | |
| 8,934,810 B2 | 1/2015 | Ishino et al. | |

(56) References Cited

U.S. PATENT DOCUMENTS

| | | |
|---|---|---|
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | El et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,988,876 B2 | 3/2015 | Corbin et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,082,031 B2 | 7/2015 | Liu et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| D737,321 S | 8/2015 | Lee |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham, IV |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein, Jr. |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Smith |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| D754,205 S | 4/2016 | Nguyen et al. |
| D754,206 S | 4/2016 | Nguyen et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| 9,319,548 B2 | 4/2016 | Showering et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,360,304 B2 | 6/2016 | Xue et al. |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |
| 9,390,304 B2 | 7/2016 | Chang et al. |
| 9,390,596 B1 | 7/2016 | Todeschini |
| D762,604 S | 8/2016 | Fitch et al. |
| 9,411,386 B2 | 8/2016 | Sauerwein, Jr. |
| 9,412,242 B2 | 8/2016 | Van et al. |
| 9,418,269 B2 | 8/2016 | Havens et al. |
| 9,418,270 B2 | 8/2016 | Van et al. |
| 9,423,318 B2 | 8/2016 | Liu et al. |
| 9,424,454 B2 | 8/2016 | Tao et al. |
| D766,244 S | 9/2016 | Zhou et al. |
| 9,436,860 B2 | 9/2016 | Smith et al. |
| 9,443,123 B2 | 9/2016 | Hejl |

(56) References Cited

U.S. PATENT DOCUMENTS

| | | |
|---|---|---|
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,487,113 B2 | 11/2016 | Schukalski |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 10,444,794 B1 | 10/2019 | De La Fuente |
| 10,809,949 B2 | 10/2020 | Wong et al. |
| 2005/0063763 A1* | 3/2005 | Lee ............... G06K 1/121 400/692 |
| 2007/0063048 A1 | 3/2007 | Havens et al. |
| 2008/0185432 A1 | 8/2008 | Caballero et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0225429 A1 | 9/2010 | Tsai |
| 2010/0265880 A1 | 10/2010 | Rautiola et al. |
| 2011/0169999 A1 | 7/2011 | Grunow et al. |
| 2011/0202554 A1 | 8/2011 | Powilleit et al. |
| 2012/0070201 A1 | 3/2012 | Shiobara |
| 2012/0111946 A1 | 5/2012 | Golant |
| 2012/0168511 A1 | 7/2012 | Kotlarsky et al. |
| 2012/0168512 A1 | 7/2012 | Kotlarsky et al. |
| 2012/0193423 A1 | 8/2012 | Samek |
| 2012/0194692 A1 | 8/2012 | Mers et al. |
| 2012/0203647 A1 | 8/2012 | Smith |
| 2012/0223141 A1 | 9/2012 | Good et al. |
| 2012/0228382 A1 | 9/2012 | Havens et al. |
| 2012/0248188 A1 | 10/2012 | Kearney |
| 2013/0043312 A1 | 2/2013 | Van Horn |
| 2013/0075168 A1 | 3/2013 | Amundsen et al. |
| 2013/0082104 A1 | 4/2013 | Kearney et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2013/0332996 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0034734 A1 | 2/2014 | Sauerwein, Jr. |
| 2014/0036848 A1 | 2/2014 | Pease et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0097249 A1 | 4/2014 | Gomez et al. |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein, Jr. |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0191684 A1 | 7/2014 | Valois |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | Digregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0332590 A1 | 11/2014 | Wang et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |

(56) References Cited

U.S. PATENT DOCUMENTS

| | | |
|---|---|---|
| 2015/0001304 A1 | 1/2015 | Todeschini |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0039878 A1 | 2/2015 | Barten |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0178523 A1 | 6/2015 | Gelay et al. |
| 2015/0178537 A1 | 6/2015 | El et al. |
| 2015/0178685 A1 | 6/2015 | Krumel et al. |
| 2015/0181109 A1 | 6/2015 | Gillet et al. |
| 2015/0186703 A1 | 7/2015 | Chen et al. |
| 2015/0193023 A1 | 7/2015 | Odgers et al. |
| 2015/0199957 A1 | 7/2015 | Funyak et al. |
| 2015/0210199 A1 | 7/2015 | Payne |
| 2015/0212565 A1 | 7/2015 | Murawski et al. |
| 2015/0213647 A1 | 7/2015 | Laffargue et al. |
| 2015/0220753 A1 | 8/2015 | Zhu et al. |
| 2015/0220901 A1 | 8/2015 | Gomez et al. |
| 2015/0227189 A1 | 8/2015 | Davis et al. |
| 2015/0236984 A1 | 8/2015 | Sevier |
| 2015/0239348 A1 | 8/2015 | Chamberlin |
| 2015/0242658 A1 | 8/2015 | Nahill et al. |
| 2015/0248572 A1 | 9/2015 | Soule et al. |
| 2015/0254485 A1 | 9/2015 | Feng et al. |
| 2015/0261643 A1 | 9/2015 | Caballero et al. |
| 2015/0264624 A1 | 9/2015 | Wang et al. |
| 2015/0268971 A1 | 9/2015 | Barten |
| 2015/0269402 A1 | 9/2015 | Barber et al. |
| 2015/0288689 A1 | 10/2015 | Todeschini et al. |
| 2015/0288896 A1 | 10/2015 | Wang |
| 2015/0310243 A1 | 10/2015 | Ackley et al. |
| 2015/0310244 A1 | 10/2015 | Xian et al. |
| 2015/0310389 A1 | 10/2015 | Crimm et al. |
| 2015/0312780 A1 | 10/2015 | Wang et al. |
| 2015/0327012 A1 | 11/2015 | Bian et al. |
| 2016/0014251 A1 | 1/2016 | Hejl |
| 2016/0025697 A1 | 1/2016 | Alt et al. |
| 2016/0026838 A1 | 1/2016 | Gillet et al. |
| 2016/0026839 A1 | 1/2016 | Qu et al. |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0062473 A1 | 3/2016 | Bouchat et al. |
| 2016/0070944 A1 | 3/2016 | McCloskey et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Franz |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini et al. |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | Dipiazza et al. |
| 2016/0192051 A1 | 6/2016 | Dipiazza et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggerty et al. |
| 2016/0204636 A1 | 7/2016 | Allen et al. |
| 2016/0204638 A1 | 7/2016 | Miraglia et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Wilz et al. |
| 2016/0314294 A1 | 10/2016 | Kubler et al. |
| 2016/0316190 A1 | 10/2016 | McCloskey et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |

(56) References Cited

U.S. PATENT DOCUMENTS

| | | |
|---|---|---|
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060183 A1 | 3/2017 | Zhang et al. |
| 2017/0060316 A1 | 3/2017 | Larson |
| 2017/0061961 A1 | 3/2017 | Nichols et al. |
| 2017/0064634 A1 | 3/2017 | Van et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress, Jr. |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | D'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Celinder et al. |
| 2017/0193727 A1 | 7/2017 | Van et al. |
| 2017/0199266 A1 | 7/2017 | Rice et al. |
| 2017/0200108 A1 | 7/2017 | Au et al. |
| 2017/0200275 A1 | 7/2017 | Mccloskey et al. |
| 2018/0018836 A1* | 1/2018 | Fankhauser ............ G08B 13/14 |
| 2018/0124379 A1* | 5/2018 | Lin ...................... G02B 25/001 |

OTHER PUBLICATIONS

Notice of Allowance and Fees Due (PTOL-85) dated Jun 22, 2020 for U.S. Appl. No. 15/880,723.

Printronix, "Online Data Validator User's Manual; SL500r and T5000r RFID Smart Label and Thermal Printers", [downloaded from http://printronixautoid.com/wp-content/uploads/manuals/PTX_UM_SL5R_T5R_OVD_253432H.pdf, May 5, 2015], Copyrighted 2005, 2012, 92 pages.

* cited by examiner

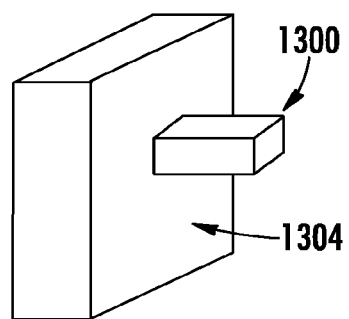
FIG. 13A
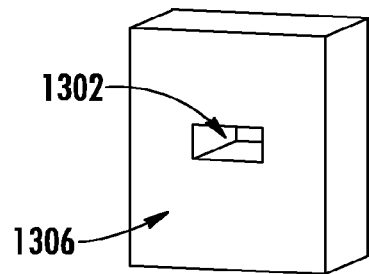
FIG. 13B
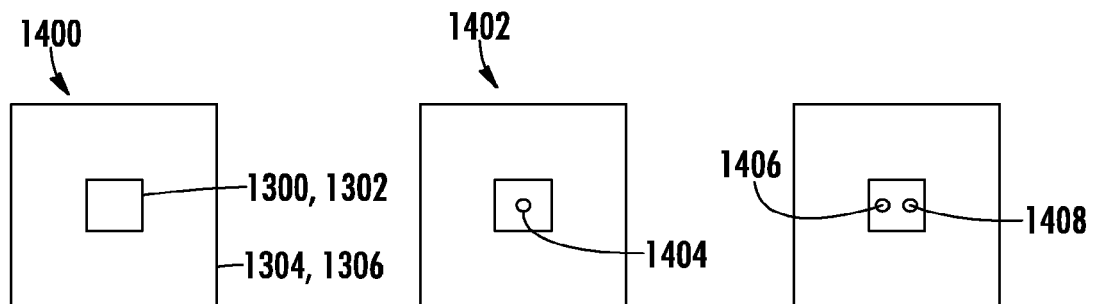
FIG. 14A  FIG. 14B  FIG. 14C

REMOVABLY COUPLABLE PRINTER AND VERIFIER ASSEMBLY

CROSS-REFERENCE TO RELATED APPLICATIONS

This application is a continuation of U.S. Non-Provisional application Ser. No. 15/880,723, filed Jan. 26, 2018, the entire contents of which are incorporated herein by reference.

FIELD OF THE INVENTION

The present disclosure relates generally to removably couplable printer and verifier assemblies, including removably couplable printer and verifier assemblies with magnets configured to removably couple a verifier module to a media cover of a printer. The present disclosure also includes removably couplable verifiers, printers configured to receive removably couplable verifiers, and systems and methods pertaining to such printers, verifiers, and removably couplable printer and verifier assemblies.

BACKGROUND

Printers exist in a variety of forms and combinations, including thermal transfer, ink-jet, dot-matrix, laser, and xerographic printers. A printer typically includes a printhead and a drive system for causing relative movement between the printhead and a print media. A print media may take the form of either a continuous roll of paper or a fanfold of paper, plastic or other print media, or individual sheets of print media. The printhead is usually controlled by print logic which outputs print commands to a print driver. The print driver uses the print commands to provide energizing signals to the printhead.

The quality of a printed output may have some variability. Additionally, printing defects may be introduced in the printed output. Variable print quality or printing defects may arise from a variety of sources, including issues associated with the printer, the print media, or the printing process. For example, typical printing parameters that may introduce quality issues or printing defects include defective or worn-out printer components; variations or defects in print media, ink, ribbon or other consumables; variations in mechanical forces and tolerances in the printer; and variations in the transport rate of the print media relative to the printhead. Additionally, with a thermal printer, quality issues or printing defects may be introduced by the thermal lag time of the resistive elements in a thermal printhead, and heat generated by adjacent resistive elements and the composition of the media.

A verifier may be used to analyze various aspects of print quality or to detect printing errors. For example, a verifier may be used to analyze printed images according to industry standards. When a verifier is integrated with a printer, printed images may be analyzed in real-time as the images are printed. Real-time verification can be used to assure that every printed output is free from errors and meets the desired quality parameters. Conversely, separate verifier units typically are used for intermittent spot-checks.

A verifier may be included as original equipment with a newly-manufactured printer. However, typically a verifier will be a premium accessory among a printer product line because of cost considerations. These cost considerations include the technical precision required to mount the verifier with the printer while assuring that the verifier and the printhead are properly aligned. Alternatively, a verifier may be added to a printer as an after-market accessory. Installation of an after-market verifier typically requires a skilled service technical to disassemble portions of the printer.

Typical verifiers tend to require a complex arrangement of brackets, screws, and other hardware for mounting the verifier to the printer. This may be the case both for original equipment and after-market verifiers. Also, a scan path of the verifier typically will be aligned to a printing path of the printer. For example, this alignment may be necessary in order to allow the verifier to scan the full width of the printed media. This alignment typically is performed manually by a technician.

Mounting the verifier requires technical skill, time, and sometimes multiple iterations to achieve the correct alignment. Service fees for after-market installation can be expensive, and the installation service itself risks damage to sensitive printer components such as the printhead. Similar issues exist during maintenance, repair, or upgrade of printers where a verifier has been installed either as original equipment or as an after-market accessory.

Additionally, oftentimes a verifier may interfere with easy access to printer components. For example, some verifiers may be positioned at a location that is inconvenient when accessing internal portions of the printer, such as when installing or changing print media or other consumables.

Accordingly, a need exists for improved printer and verifier assemblies, and related systems and methods. This need is addressed by the presently disclosed removably couplable printer and verifier assemblies, including embodiments with magnets configured to removably couple a verifier module to a printer. This need is further addressed by the presently disclosed systems and methods pertaining to such removably couplable printer and verifier assemblies.

SUMMARY

Accordingly, in one aspect, the present disclosure embraces a verifier and printer assembly with a verifier module that has a magnetic docking element, and a printer that has a docking portion operable to dock the verifier module. The magnetic docking element and the docking portion interact with each other to removably couple the verifier module to the printer.

In another aspect, the present disclosure embraces a magnetic attachment system for a verifier module. The magnetic attachment system includes a verifier module, a printer, and a magnetic connecting structure. The magnetic connecting structure includes a first magnetic docking element and a second magnetic docking element operable to removably couple the verifier module to the printer. The verifier module includes the first magnetic docking element and the printer includes the second magnetic docking element.

In some embodiments, the present disclosure embraces a removably couplable printer and verifier assembly. The removably couplable printer may include a media cover that has a printer-coupling and a verifier. The verifier may include a media support attached to the printer at a media-support attachment point. The verifier also may include a verifier module with a verifier-coupling configured to interface with the printer-coupling. The verifier-coupling and/or the printer-coupling may include one or more magnets configured to removably couple the verifier module to the media cover at least in part by magnetic force acting between the verifier-coupling and the printer-coupling.

A printer typically includes a printhead that has an array of print elements configured to print sequential segments of an image on corresponding sequential segments of a print media, and a platen roller configured to advance the print media when printing the sequential segments. A verifier typically includes an image sensor having an array of photo sensors configured to capture a representation of at least a portion of the sequential segments of the image having been printed on the print media as the platen roller advances the print media. In some embodiments, with the verifier module removably coupled to the media cover, magnetic force acting between the verifier-coupling and the printer-coupling operates to align the array of photo sensors to a fixed scanning position relative to the array of print elements.

The fixed scanning position may include the array of photo sensors having a substantially parallel orientation to a lateral print axis corresponding to the array of print elements. Additionally, the fixed scanning position may further include a photo sensor reference point corresponding to the array of photo sensors substantially aligned laterally with respect to a print axis reference point corresponding to the lateral print axis. Further, the fixed scanning position may also include the photo sensor reference point positioned substantially at a fixed distance from a media support reference point corresponding to the media support. The fixed distance from the media support reference point may be configured to provide space for advancing print media to move between the verifier module and the media support.

In some embodiments, the removably couplable printer and verifier assembly includes a verifier receiving space configured to removably couple with the verifier module. The verifier receiving space may be provided on a media cover of the printer.

In some embodiments, the verifier module includes one or more protrusions and the verifier receiving space includes one or more recesses corresponding to the one or more protrusions. Each of the one or more protrusions may be configured to fittingly mate with the respective one or more recesses.

In some embodiments, the verifier module includes one or more magnets and the verifier receiving space includes a magnetic material. The one or more magnets may be configured to interact with the magnetic material. Alternatively, or in addition, in some embodiments the verifier receiving space includes one or more magnets and the verifier module includes a magnetic material with which the one or more magnets interact.

In some embodiments, a verifier module includes a verifier-coupling magnetic array, and the verifier receiving space includes a printer-coupling magnetic array. Magnetic force acting between the verifier-coupling magnetic array and the printer-coupling magnetic array may be operable to align the array of photo sensors to the fixed scanning position. In some embodiments, at least one of the one or more magnets may be an electromagnet.

In some embodiments, the verifier-coupling magnetic array may include a first magnetic verifier-coupling with a north-polarity magnetic surface adjacent to and abutting a south-polarity magnetic surface along a first verifier-coupling magnetic border. The verifier-coupling magnetic array may additionally include a second magnetic verifier-coupling with a north-polarity magnetic surface adjacent to and abutting a south-polarity magnetic surface along a second verifier-coupling magnetic border.

Likewise, in some embodiments, the printer-coupling magnetic array may include a first magnetic printer-coupling with a north-polarity magnetic surface adjacent to and abutting a south-polarity magnetic surface along a first printer-coupling magnetic border. The printer-coupling may additionally include a second magnetic printer-coupling with a north-polarity magnetic surface adjacent to and abutting a south-polarity magnetic surface along a second printer-coupling magnetic border.

The first magnetic printer-coupling may be configured to removably couple with the first magnetic verifier-coupling. Magnetic force acting between the first magnetic verifier-coupling and the first magnetic printer-coupling may operate to substantially align a photo sensor reference point laterally with respect to the print axis reference point. The second magnetic printer-coupling may be configured to removably couple with the second magnetic verifier-coupling. Magnetic force acting between the second magnetic verifier-coupling and the second magnetic printer-coupling may operate to position the photo sensor reference point substantially at the fixed distance from the media support reference point.

In some embodiments, the verifier-coupling magnetic array may further include a third magnetic verifier-coupling with a north-polarity magnetic surface adjacent to and abutting a south-polarity magnetic surface along a third verifier-coupling magnetic border. Likewise, the printer-coupling magnetic array may further include a third magnetic printer-coupling with a north-polarity magnetic surface adjacent to and abutting a south-polarity magnetic surface along a third printer-coupling magnetic border. The third magnetic printer-coupling may be configured to removably couple with the third magnetic verifier-coupling. Magnetic force acting between the third magnetic verifier-coupling and the third magnetic printer-coupling may further operate to substantially align the photo sensor reference point laterally with respect to the print axis reference point.

In some embodiments, the verifier-coupling magnetic array may further include a fourth magnetic verifier-coupling with a north-polarity magnetic surface adjacent to and abutting a south-polarity magnetic surface along a fourth verifier-coupling magnetic border. Likewise, the printer-coupling magnetic array may further include a fourth magnetic printer-coupling with a north-polarity magnetic surface adjacent to and abutting a south-polarity magnetic surface along a fourth printer-coupling magnetic border. The fourth magnetic printer-coupling may be configured to removably couple with the fourth magnetic verifier-coupling. Magnetic force acting between the fourth magnetic verifier-coupling and the fourth magnetic printer-coupling may further operate to position the photo sensor reference point substantially at the fixed distance from the media support reference point.

In some embodiments, at least a portion of the first magnetic verifier-coupling and at least a portion of the second magnetic verifier-coupling may share a north-polarity magnetic surface and/or a south-polarity magnetic surface. At least a portion of the first magnetic verifier-coupling and at least a portion of the second magnetic verifier-coupling may share a north-polarity magnetic surface and/or a south-polarity magnetic surface. At least a portion of the second magnetic verifier-coupling and at least a portion of the third magnetic verifier-coupling may share a north-polarity magnetic surface and/or a south-polarity magnetic surface. At least a portion of the third magnetic verifier-coupling and at least a portion of the fourth magnetic verifier-coupling may share a north-polarity magnetic surface and/or a south-polarity magnetic surface. At least a portion of the fourth magnetic verifier-coupling and at least a portion of the first magnetic verifier-coupling may share a north-polarity magnetic surface and/or a south-polarity magnetic surface.

In some embodiments, a verifier module may include one or more verifier-fittings, and the media cover may include one or more printer-fittings. The one or more verifier-fittings and the one or more printer-fittings may be respectively configured to fittingly mate with one another. These fittings may aid alignment of the array of photo sensors to the fixed scanning position. A verifier-coupling may include at least a portion of the one or more verifier-fittings. A printer-coupling may include at least a portion of the one or more printer-fittings.

In some embodiments, a verifier may include a verifier communication module, and a printer may include a printer communication module. The printer and the verifier module may be configured to communicate with one another at least in part by a communication link between the printer-communication interface and the verifier-communication interface. Thus, the verifier communication module and the printer communication module may be configured to communicate with one another. The verifier communication module and the printer communication module may be configured to communicate with one another wirelessly.

In some embodiments, a verifier module includes a verifier power source. The verifier power source may include a battery, a capacitor, and/or a supercapacitor. The verifier power source may include a wireless energy harvesting node configured to harvest energy from a wireless signal. The printer may include a wireless communication module, and the wireless energy harvesting node may include an energy harvesting circuit configured to harvest energy from a wireless signal transmitted by the wireless communication module.

In some embodiments, the verifier-coupling includes at least a portion of the verifier-communication interface, and/or the printer-coupling includes at least a portion of the printer-communication interface. Additionally, or in the alternative, one of the one or more verifier-fittings may include at least a portion of the verifier-communication interface, and/or one of the one or more printer-fittings may include at least a portion of the printer-communication interface.

In some embodiments, the verifier power source includes a verifier-power interface and the printer includes a printer-power interface. The printer-power interface may be configured to supply electrical power to the verifier at least in part by an electrical connection between the verifier-power interface and the printer-power interface. The verifier-coupling may include at least a portion of the verifier-power interface, and/or the printer-coupling may include at least a portion of the printer-power interface. Additionally, or in the alternative, one of the one or more verifier-fittings may include at least a portion of the verifier-power interface, and/or one of the one or more printer-fittings may include at least a portion of the printer-power interface.

In yet another aspect, the present disclosure embraces methods of removably coupling a verifier module and a printer for verification of a printed machine-readable symbol. The method comprises positioning the verifier module in proximity with the printer causing interaction between a magnetic docking element of the verifier module and a docking portion of the printer and magnetically attaching the verifier module to the printer using the interaction.

In some embodiments a method of removably coupling a verifier module to a printer includes positioning a verifier module that has a verifier-coupling in proximity with a printer that has a verifier receiving space with a printer-coupling. The verifier-coupling and/or the printer-coupling may include one or more magnets configured to supply magnetic force. The method may include removably coupling the verifier module to the media cover at least in part by magnetic force acting between the verifier-coupling and the printer-coupling.

The printer may include a printhead with an array of print elements configured to print sequential segments of an image on corresponding sequential segments of a print media, and a platen roller configured to advance the print media when printing the sequential segments. The verifier module may include an image sensor with an array of photo sensors configured to capture a representation of at least a portion of the sequential segments of the image having been printed on the print media as the platen roller advances the print media.

Removably coupling the verifier module to the media cover may include aligning the array of photo sensors to a fixed scanning position relative to the array of print elements. Removably coupling the verifier module to the media cover may additionally include fittingly mating one or more verifier-fittings and one or more printer-fittings with one another.

The array of photo sensors may be aligned to the fixed scanning position at least in part by magnetic force acting between the verifier-coupling and the printer-coupling. Aligning the array of photo sensors to the fixed scanning position may include orienting the array of photo sensors substantially parallel to a lateral print axis corresponding to the array of print elements.

The foregoing summary is illustrative only, and is not intended to be in any way limiting. In addition to the illustrative features and embodiments described above, further aspects, features, and embodiments will become apparent by references to the following drawings, the detailed description set forth below, and the claims.

BRIEF DESCRIPTION OF THE DRAWINGS

FIGS. 13A and 13B schematically illustrate an exemplary verifier-fitting and corresponding printer-fitting.

FIGS. 14A-14C schematically illustrate additional exemplary verifier-fittings and/or corresponding printer-fittings.

DETAILED DESCRIPTION

In the following detailed description, various aspects and features are described in greater detail with reference to the accompanying figures, including among other aspects and features, exemplary embodiments of removably couplable printer and verifier assemblies, including embodiments with magnets configured to removably couple a verifier module to a media cover of a printer. These various aspects and features further include systems and methods pertaining to such removably couplable printer and verifier assemblies. Numerous specific details are set forth in order to provide a thorough understanding of the present disclosure. It will be apparent, however, to one skilled in the art, that the presently disclosed devices, systems, and methods may be performed without some or all of these specific details. In other instances, well known aspects have not been described in detail in order not to unnecessarily obscure the present disclosure. The following detailed description is therefore not to be taken in a limiting sense, and it is intended that other embodiments are within the spirit and scope of the present disclosure.

Figure 1:
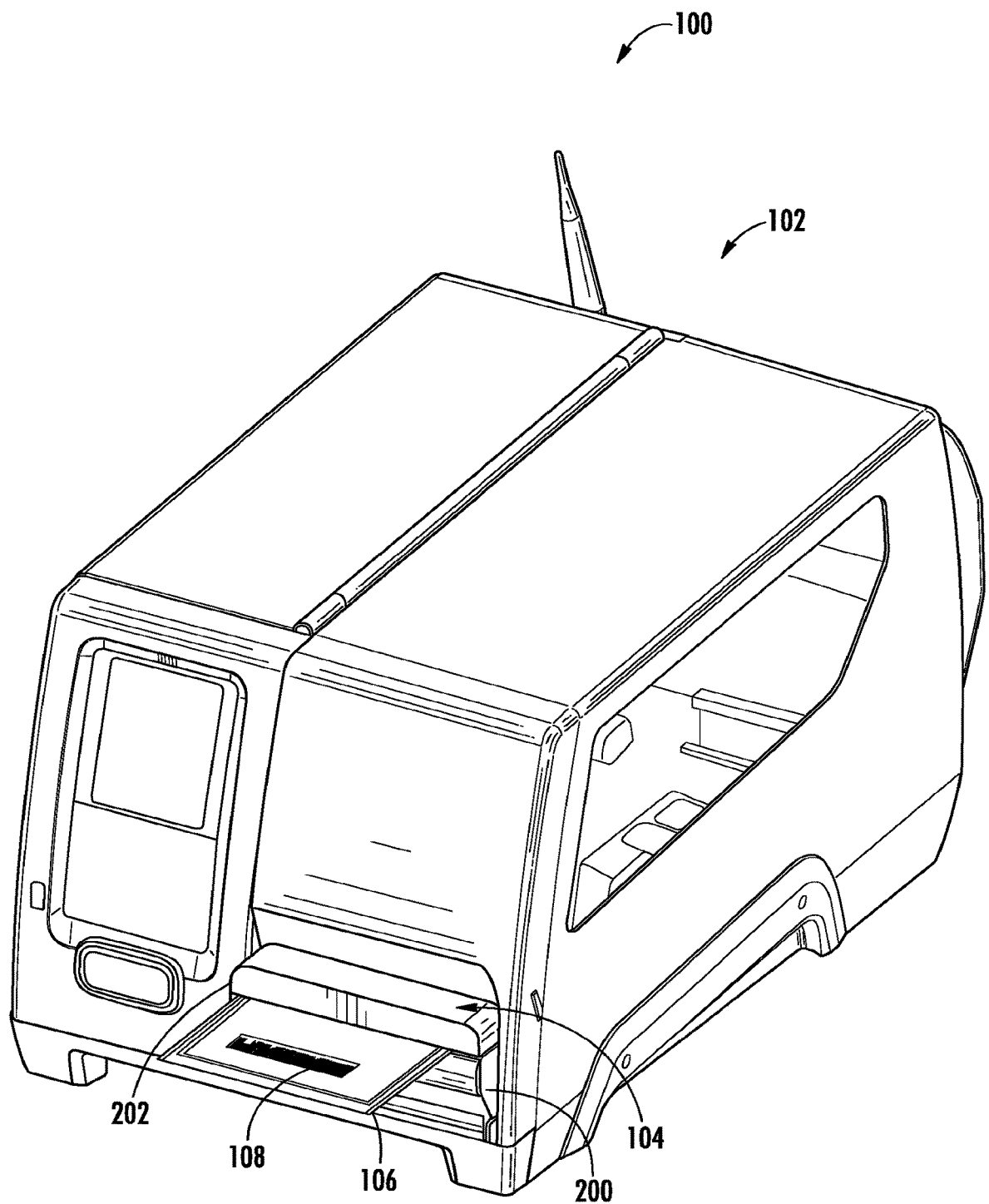
FIG. 1 shows a perspective view of an exemplary printer with a removably couplable verifier.

FIG. 1 shows an exemplary removably couplable printer and verifier assembly 100. The assembly includes a printer 102 and a removably couplable verifier 104 mounted to the printer. The printer may be a thermal transfer printer, or any other type of printer. As the printer prints a print media 106, the verifier 104 scans printed images 108 to analyze various aspects of print quality or to detect printing errors.

Figure 2:
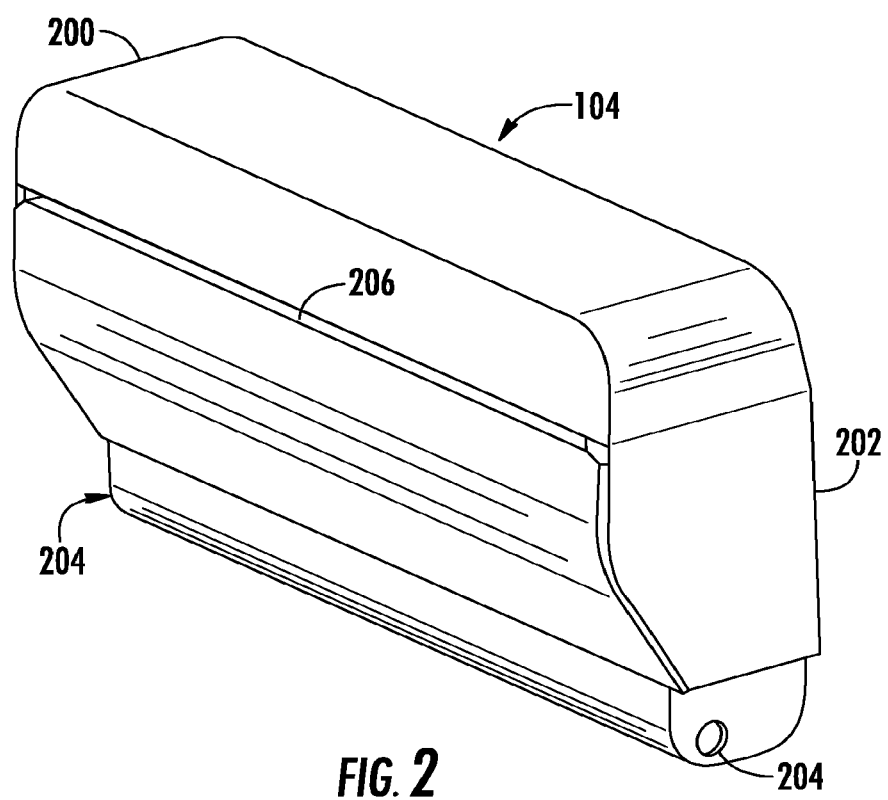
FIG. 2 shows a perspective view of an exemplary removably couplable verifier for use in a removably couplable printer and verifier assembly.

An exemplary removably couplable verifier 104 is shown in more detail in FIG. 2. The exemplary verifier 104 includes a media support 202 and a verifier module 200. The verifier module 200 includes an image sensor with an array of photo sensors, and other components discussed herein. The verifier module scans printed media and provides a digital representation of an image that has been printed on the printed media. The digital representation of the image may then be compared to the image as instructed by the print logic. This comparison may be used to analyze aspects of print quality or to detect printing errors.

The media support may be secured to the printer at one or more media-support attachment points 204. Bolts, screws, pins, rivets, or other mounting hardware may be used to attach the media support to the printer. The media support may be attached to the printer, in a fixed or demountable configuration. Alternatively, the media support may be permanently fixed to the printer.

The verifier module 200 typically resides above the media support 202. For example, the verifier module may be configured to align with the media support, and a portion of the verifier module may rest on the media support. Alternatively, the verifier module, when removably coupled to the printer, may be supported above the media support. A media space 206 provides room for advancing print media to move between the verifier module and the media support.

The verifier module may be removably coupled to the printer, such as to a suitable portion of the printer case, enclosure, or chassis. For example, the verifier module may be removably coupled to a media cover or door. The verifier module may be removably coupled to an internal or an external portion of the printer.

Figure 3A:
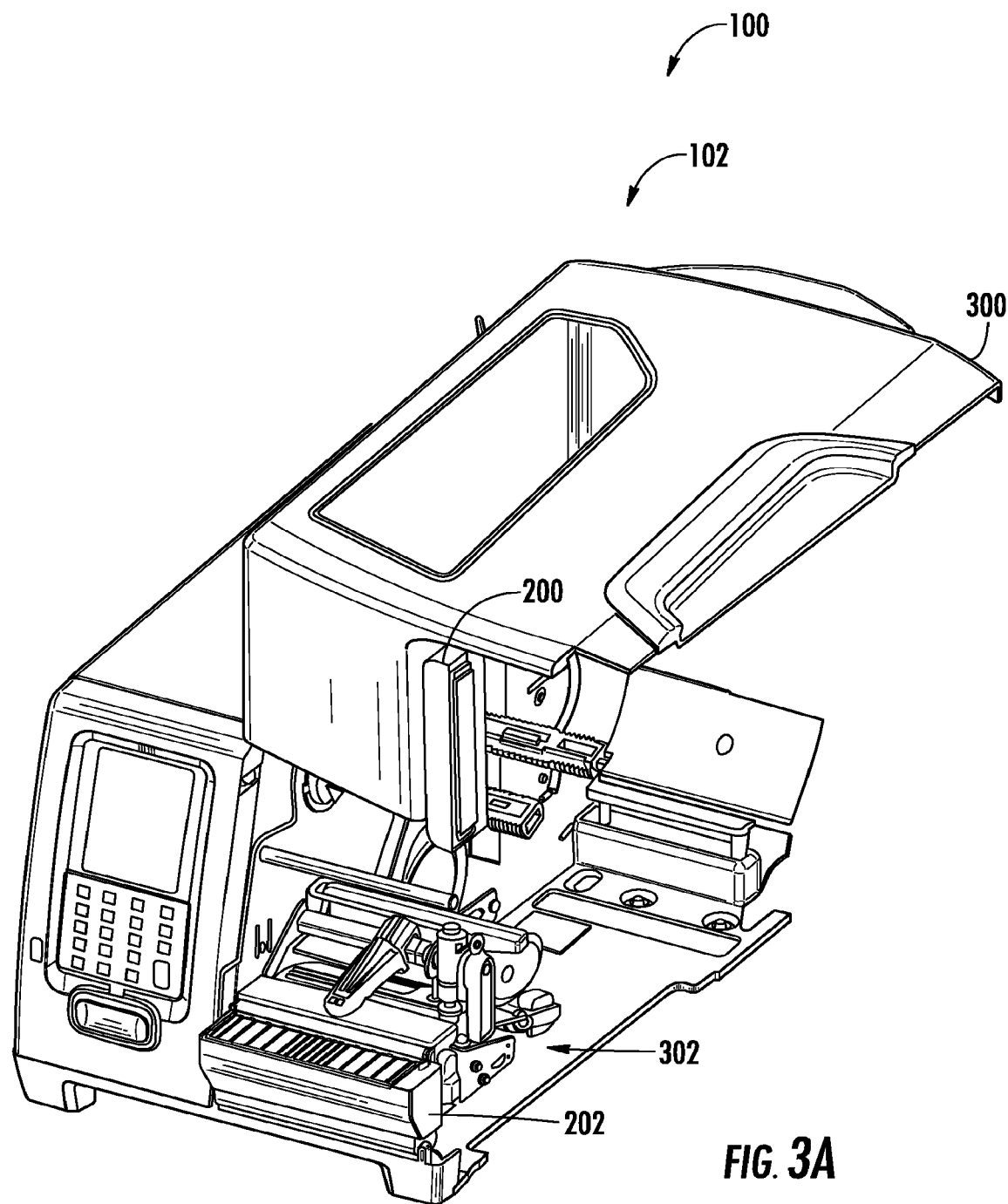
FIGS. 3A and 3B respectively show front and rear perspective views of the exemplary printer of FIG. 1, with a media cover in an open position.
Figure 3B:
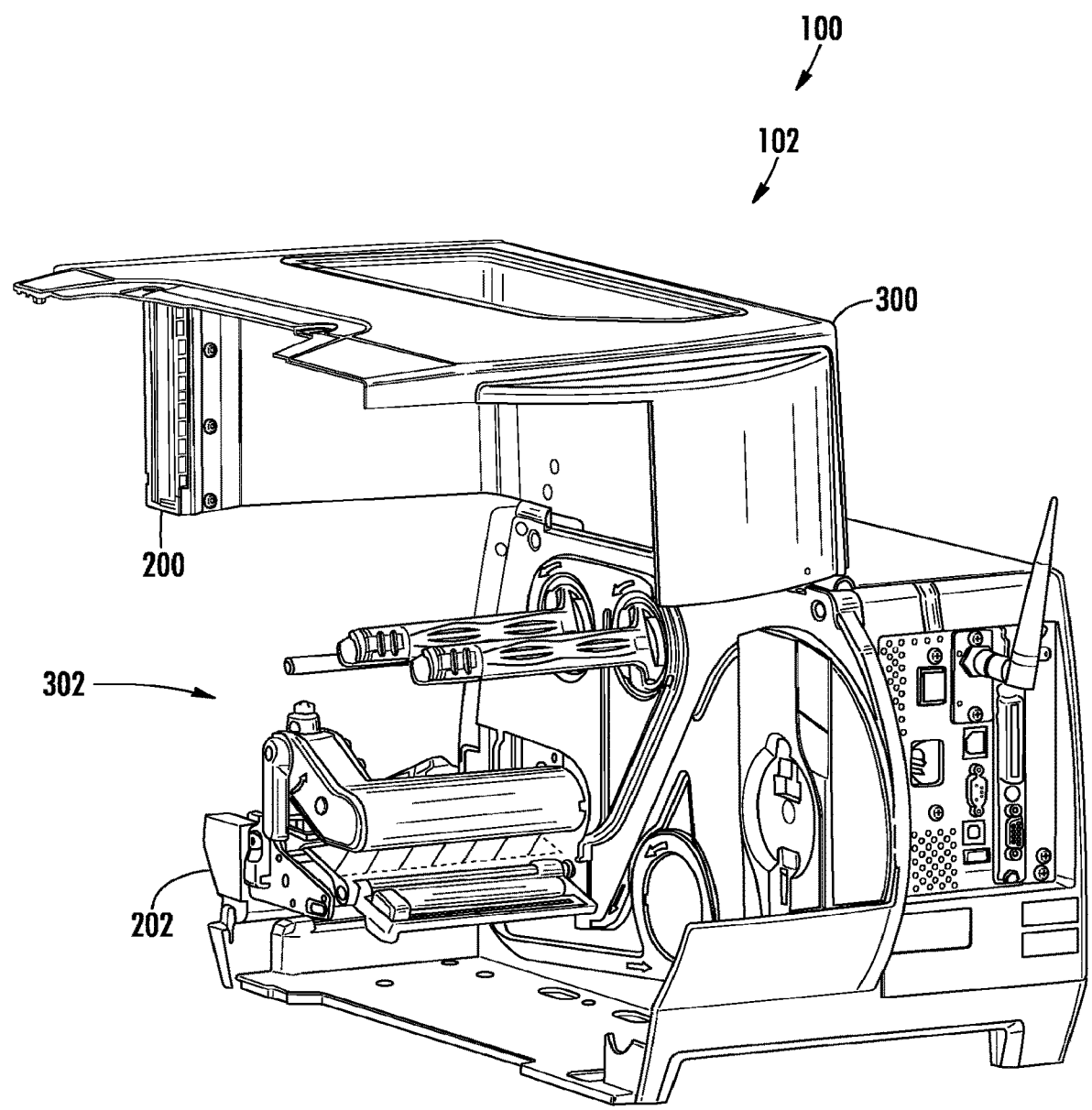

As shown in FIGS. 3A and 3B, an exemplary printer may include a media cover 300. In an exemplary embodiment, the verifier module 200 may be removably coupled to the media cover 300. In some embodiments, a media cover or door may be considered part of a printer case, enclosure, or chassis. As shown, the verifier module 200 is removably coupled to an external portion of the media cover 300. Alternatively, the verifier module 200 may be removably coupled to an internal portion of the media cover 300. In other embodiments, the verifier module 200 may be removably coupled to an internal or external portion of a different part of the printer case, enclosure, or chassis.

The media cover 300 can be pivoted from a closed position (as shown in FIG. 1) to an open position (as shown in FIGS. 3A and 3B). The media cover provides access to various internal components of the printer, such as to install or replace print media, ink, ribbon, or other consumables. The media cover also may provide access for performing various tasks related to maintaining or repairing the printer.

As shown in FIGS. 3A and 3B, when the media cover 300 pivots to an open position, the verifier module 200, being removably coupled to the media cover, accompanies the media cover. This facilitates access to internal comments of the printer through the media cover, such as the printhead assembly 302 and media supply components. Also, when the verifier module 200 pivots away from the media support 202 as the media cover 300 opens, access to the media space 206 is provided. This may facilitate threading print media along a media path. For example, with the verifier module 200 pivoted out of the way, a tail of the print media 106 (see FIG. 1) may be positioned across the media support 202 in preparation for printing. Then, when the media cover 300 pivots to the close position, the verifier module 200 likewise pivots into position above the media support 202, with the print media tail residing within the media space 206. The print media advances along the media path, through the media space 206 between the verifier module 200 and the media support 202, allowing the printed media to be scanned as discussed herein.

The verifier module 200 may be removably coupled to the printer, providing a removably couplable printer and verifier assembly. In some embodiments, the verifier module includes a verifier-coupling and the printer includes a printer-coupling. The verifier-coupling may be configured to interface with the printer-coupling. One or both of the verifier-coupling and the printer-coupling may include one or more magnets. The one or more magnets may be configured to removably couple the verifier module to the printer. For example, as shown in FIGS. 3A and 3B, the verifier module 200 may be removably coupled to the media cover 300.

Figure 4A:
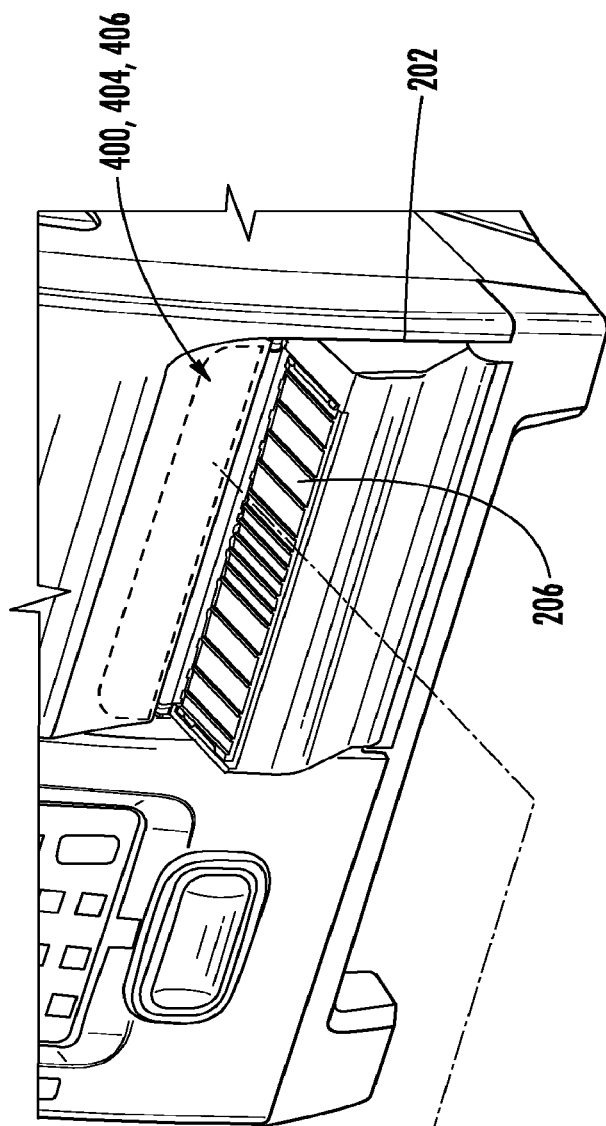
FIGS. 4A-4C show close-up perspective views of various exemplary embodiments of a verifier receiving space of a removably couplable printer and verifier assembly.
Figure 4B:
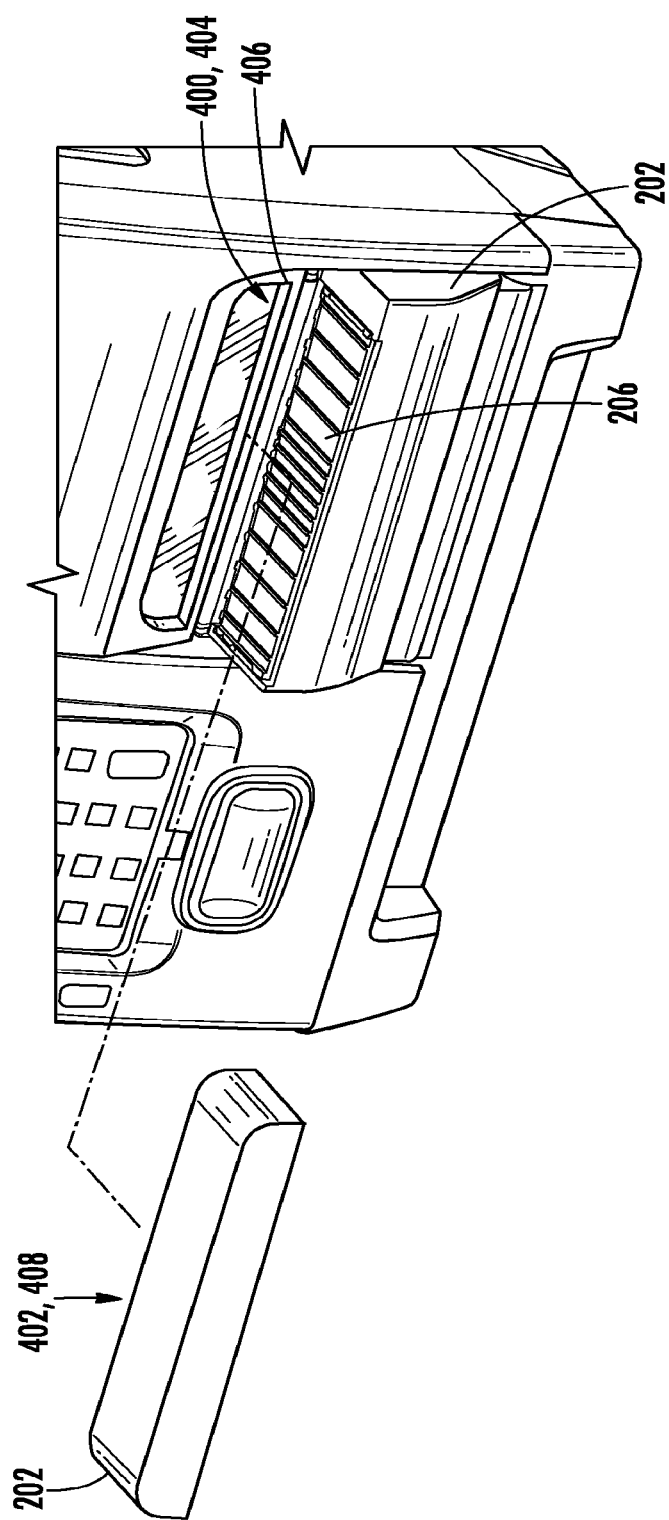
Figure 4C:
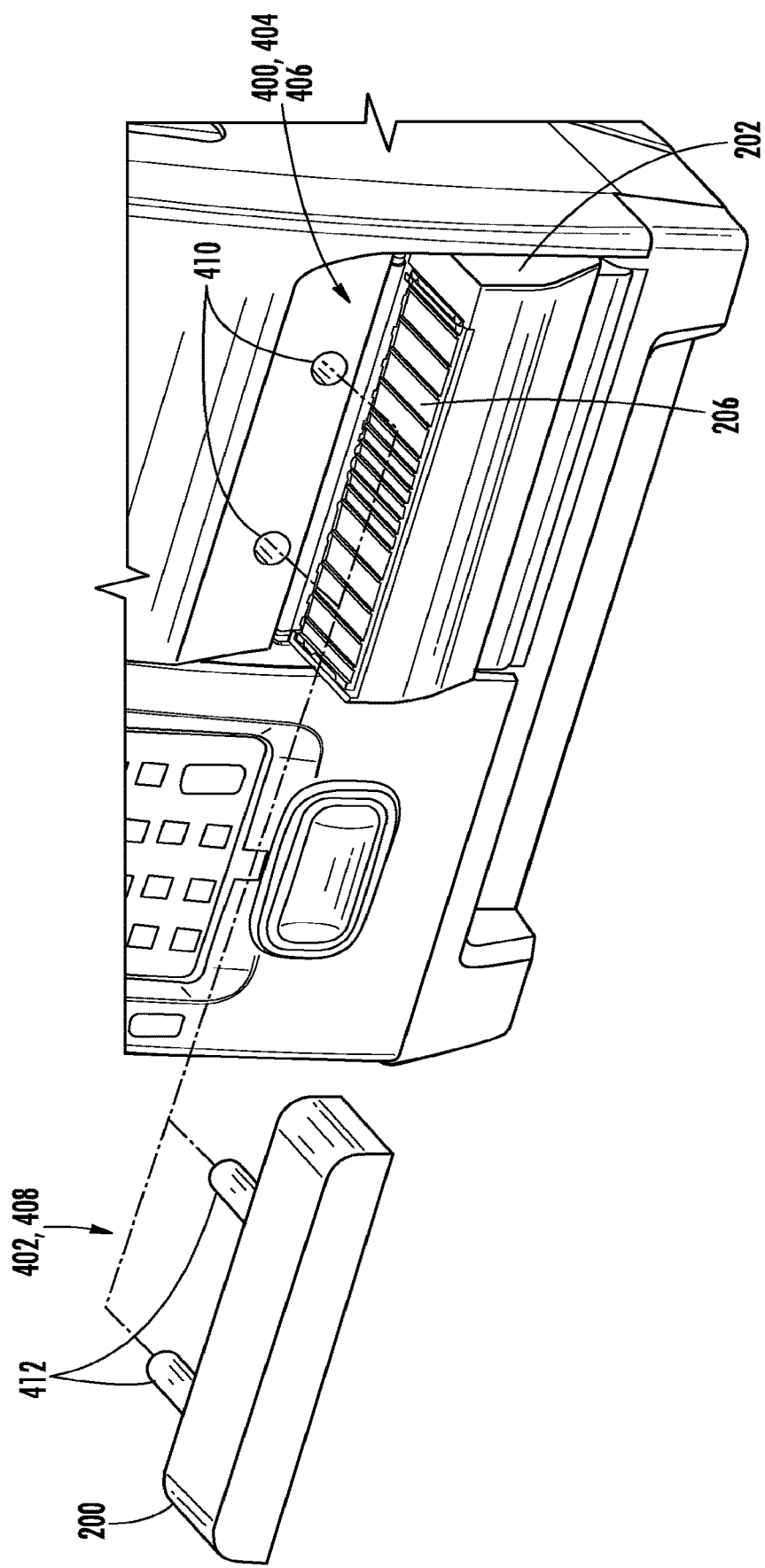

In some embodiments, a printer may include a verifier receiving space where the verifier module 200 removably couples with the printer. The verifier receiving space may be configured in accordance with the present disclosure, so as to removably couple with the verifier module. The verifier receiving space may be suitably located on the media cover or elsewhere where the verifier module removably couples with the printer. FIGS. 4A-4C show various exemplary embodiments of a verifier receiving space 400. The verifier receiving space may be suitably located on the media cover, as shown in FIGS. 4A-4C. Alternatively, the verifier receiving space may be suitable located at any other location where the verifier module removably couples with the printer.

The verifier receiving space 400 may be configured to removably couple with the verifier module 200. The verifier module 200 includes a verifier-coupling 402 configured to removably couple with a printer-coupling 404 at the verifier receiving space 400. The verifier-coupling 402 includes one or more magnets or electromagnets, and/or one or more verifier-fittings (e.g., protrusions or recesses) configured to removably couple with the printer-coupling. Likewise, the printer-coupling 404 includes one or more magnets or electromagnets, and/or one or more printer-fittings (e.g., protrusions or recesses) configured to removably couple with the verifier-coupling. Magnetic force acting between the verifier-coupling and the printer-coupling may removably couple the verifier module to the printer at the verifier receiving space 400. As shown in FIG. 4A, the verifier receiving space 400 may have a substantially smooth surface configured to abut with a corresponding surface of the verifier module. Magnetic force may be supplied by one or more magnets or electromagnets, to removably couple the verifier module at the verifier receiving space. The one or more magnets or electromagnets may be arranged in a magnetic array as discussed herein.

In some embodiments, the verifier module may include a verifier-coupling magnetic array and the verifier receiving space may include printer-coupling magnetic array. For example, the media cover 300 may include a printer-coupling magnetic array. Magnetic force acting between the verifier-coupling magnetic array and the printer-coupling magnetic array may removably couple the verifier module 200 to the printer at the verifier receiving space 400. Additionally, the magnetic force acting between the verifier-coupling magnetic array and the printer-coupling magnetic array may be effective to align a reference point on the verifier module 200 with a reference point on the printer, thereby providing a fixed scanning position as discussed herein.

In some embodiments, the verifier receiving space 400 may be configured at least partially from a non-magnetic material, and magnetic force acting between the verifier-coupling magnetic array and the printer-coupling magnetic array may be sufficiently strong to removably couple the verifier module to the printer at the verifier receiving space and/or to align a reference point on the verifier module 200 with a reference point on the printer. For example, the media cover 300 may be a plastic or other non-magnetic material, and a printer-coupling magnetic array may be located within or behind the non-magnetic material of the media cover.

Alternatively, in some embodiments the verifier receiving space may be formed at least in part from a magnetic material. The verifier receiving space may itself exert a magnetic force. In one embodiment, the verifier receiving space may include one or more magnets or electromagnets, which may be arranged as a magnetic array, thereby providing a printer-coupling configured to interface with the verifier-coupling. In another embodiment, the verifier receiving space may be formed of a magnetic material, such as a metal alloy or other ferromagnetic material. The magnetic material may not itself provide a meaningful magnetic field, but may be sufficiently attracted to a magnetic field provided by the verifier-coupling to removably couple the verifier module 200 to the verifier receiving space 400.

In some embodiments a verifier module may include one or more protrusions (verifier-fittings) and a verifier receiving space 400 may include one or more recesses (printer-fittings) corresponding to the one or more protrusions. Similarly, the verifier module may include one or more recesses (verifier-fittings) and the verifier receiving space 400 may include one or more corresponding protrusions (printer-fittings), or each may include a combination of corresponding recesses and protrusions. Each of the one or more verifier-fittings may be configured to fittingly mate with the respective one or more printer-fittings.

FIG. 4B shows a verifier receiving space 400 with a printer-coupling 404 that includes recess or printer-fitting 406. The recess may help align a reference point on the verifier module 200 with a reference point on the printer, thereby providing a fixed scanning position. As shown, the recess or printer-fitting 406 has a shape that corresponds to the perimeter shape of the verifier module. Thus, the perimeter shape of the verifier module itself may be considered a verifier-fitting 408, allowing the verifier module 200 to fittingly mate with the recess or printer-fitting 402. The depth of the recess 406 may be selected to provide a sufficient interface with the verifier module 402 or verifier fitting 408. In general, a relatively shallow recess may be sufficient, although a deeper slot-like recess also may be provided.

FIG. 4C shows an exemplary verifier receiving space with a printer-coupling 404 that includes a plurality of recesses or printer-fittings 410. Also, as shown in FIG. 4C, a verifier module 402 may have a verifier-coupling 408 that include a corresponding plurality of protrusions or verifier-fittings 412 configured to fittingly mate with the plurality of recesses or printer-fittings 410. The plurality of printer fittings shown in FIG. 4C may similarly help align a reference point on the verifier module 200 with a reference point on the printer, thereby providing a fixed scanning position. The protrusions or verifier-fittings 413 may include ridges or other features (not shown) configured to allow the verifier-fittings to snap into position in the printer-fittings, as corresponding elements fittingly mate with one another (also not shown). In some embodiments, features of the verifier receiving space shown in FIG. 4B may be combined with features of the verifier receiving space shown in FIG. 4C. For example, a verifier receiving space 400 may include a printer-coupling 404 with a printer-fitting 406 that has both a shallow recess with a shape corresponding to the perimeter shape of the verifier module, as well as a plurality of recesses configured to fittingly mate with a verifier-coupling on a verifier module that has corresponding protrusions or verifier-fittings 412.

Figure 5A:
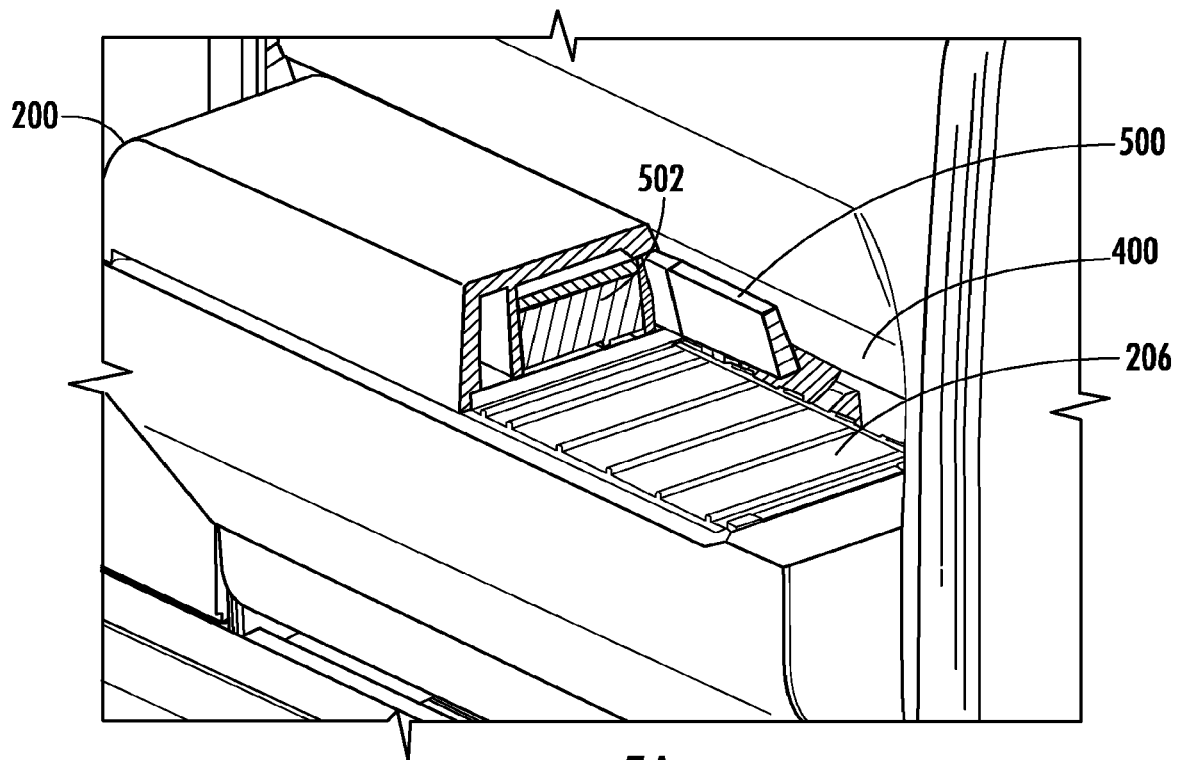
FIGS. 5A and 5B show close-up perspective views of an exemplary removably couplable printer and verifier assembly, with aspects cut-away to show further details.
Figure 5B:
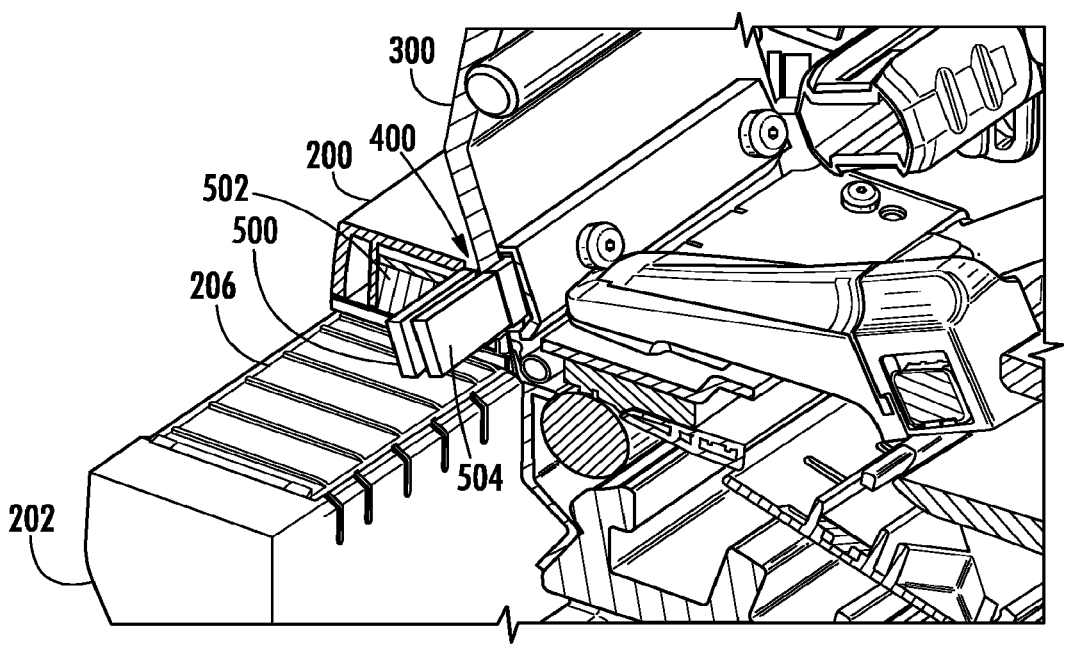

FIGS. 5A and 5B show cut-away views of an exemplary removably couplable printer and verifier assembly. As shown in FIG. 5A, a verifier module 200 may include one or more magnets, providing a verifier-coupling magnetic array 500. The verifier-coupling magnetic array 500 may be integral with the verifier module. Magnetic surfaces of the verifier-coupling magnetic array 500 may be exposed, or the magnets making up the magnetic array may be contained within a casing of the verifier module. The verifier module includes an image sensor 502 with an array of photo sensors (not shown), and other components discussed herein. The array of photo sensors is typically oriented along a scan line (not shown) which typically runs perpendicular to the print direction.

As shown in FIG. 5B, a verifier receiving space 400 also may include one or more magnets providing a printer-coupling magnetic array 504. Magnetic surfaces of the printer-coupling magnetic array 504 may be exposed, or the magnets making up the magnetic array may be contained within or attached inside the printer case. As shown, the printer-coupling magnetic array 504 is attached to the inside of the media cover 300. Magnetic force acting between the verifier-coupling magnetic array 500 and the printer-coupling magnetic array 504 removably couples the verifier module 200 to the media cover 300 of the printer.

Figure 6A:
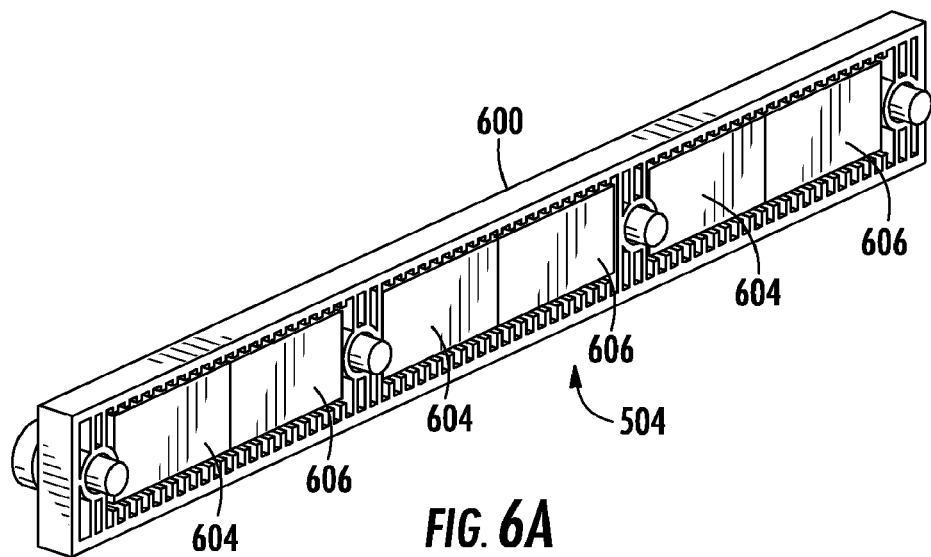
FIGS. 6A and 6B respectively show perspective views of an exemplary printer coupling and attachment thereof to a media cover according to various embodiments of a removably couplable printer and verifier assembly.
Figure 6B:
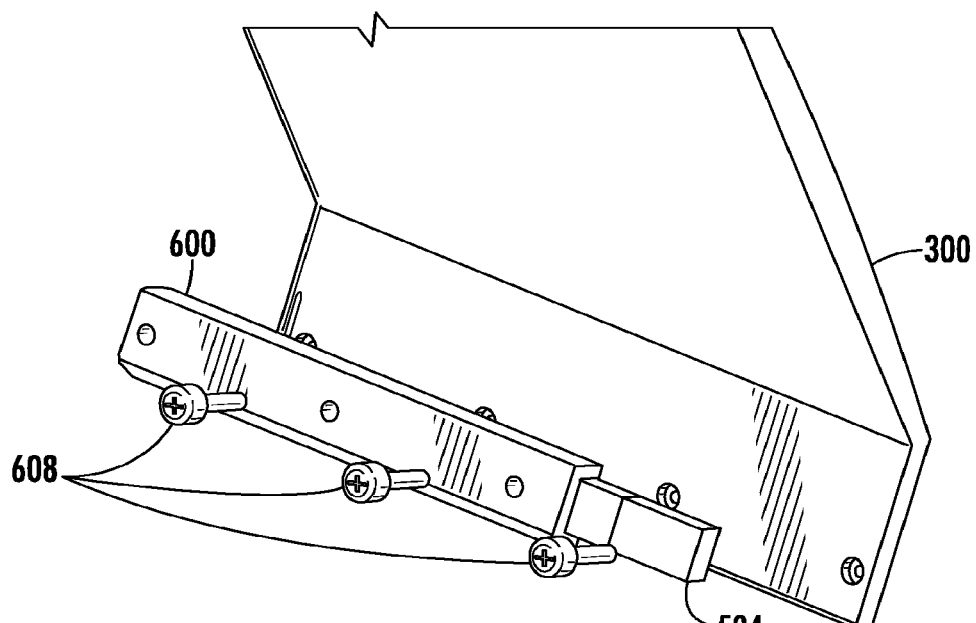

FIG. 6A shows an exemplary printer-coupling 600. The printer coupling 600 includes a printer-coupling magnetic array 504. The printer coupling magnetic array includes a series of magnets with alternative north-polarity magnetic surfaces 604 and south polarity magnetic surfaces 606. FIG. 6B show an exemplary attachment of a printer-coupling 600 to a media cover 300, using a plurality of screws or similar hardware 608. A printer-coupling 600 also may be hard-mounted to a media cover or other portion of a printer, or attached using an adhesive or any other suitable attaching elements or material. Alternatively, a printer-coupling may be formed as an integral part of a media cover.

In an exemplary embodiment, a verifier module has a fixed scanning position such that with the verifier module removably coupled to a verifier receiving space, a reference point on the verifier module aligns with a reference point on the printer. The fixed scanning position provides a reference point for comparison of digital representations of scanned images obtained from the verifier module to the images as instructed by print logic. In an exemplary embodiment, each pixel of a scanned image may be correlated to a corresponding print command. The fixed scanning position may be provided by magnetic force, one or more verifier-fittings and the one or more printer-fittings respectively configured to fittingly mate with one another, or a combination of magnetic force and fittings.

Figure 7A:
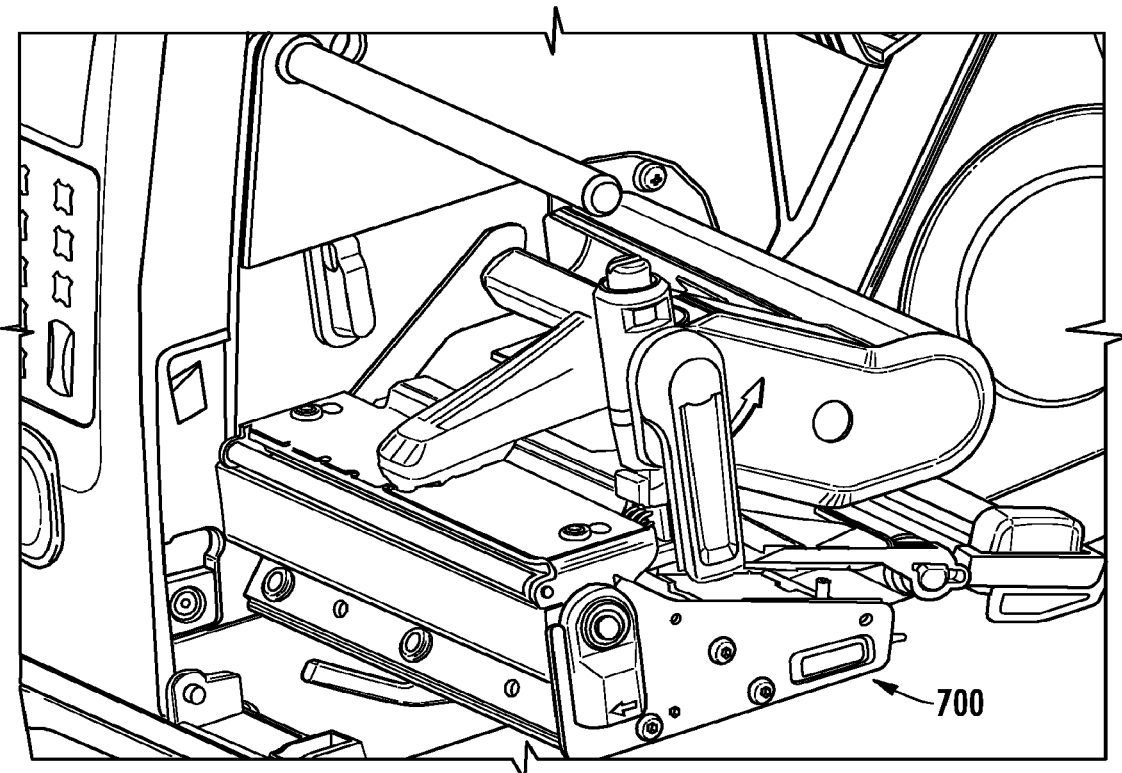
FIG. 7A shows a close-up perspective view of an exemplary printhead assembly.
Figure 7B:
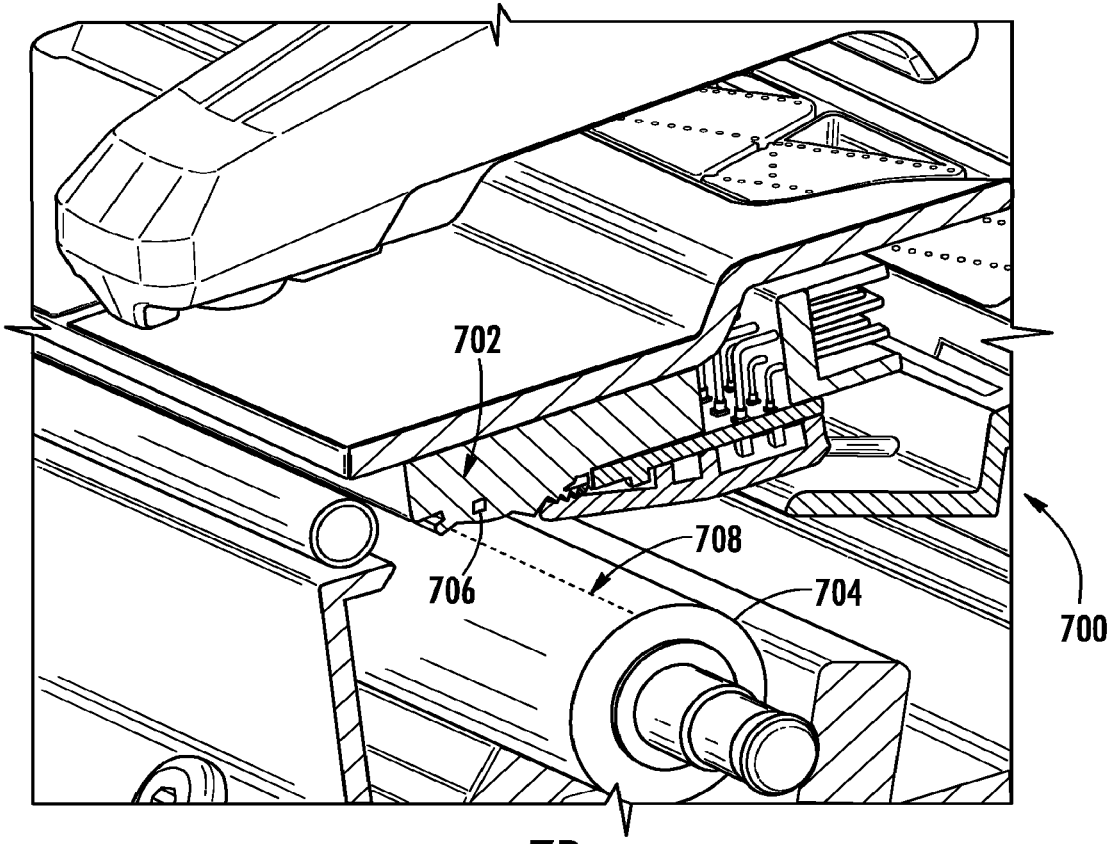
FIG. 7B shows close-up perspective view of the exemplary printhead assembly of FIG. 7A, with aspects cut-away to show further details.

FIG. 7A shows an exemplary printhead assembly 700. The exemplary printhead assembly may be included in various embodiments of a removably couplable printer and verifier assembly. FIG. 7B shows a cut-away view of the exemplary printhead assembly 700. The printhead assembly includes a printhead 702 and a platen roller 704. The printhead includes an array of print elements 706. The array of print elements is configured to print sequential segments of an image on corresponding sequential segments of a print media, while the platen roller advances the print media at a printing rate. Typically, the array of elements 706 are aligned substantially parallel to the lateral axis of the platen roller 708, which is sometimes referred to as a "burn line" or a "lateral print axis." The "burn line" may be characterized, for example, as a single line or location where the printhead is configured to be in contact with the print media. It is at the burn line where the printhead prints sequential segments of an image on a print medium. The sequential segments are thus printed on the print media along the lateral print axis, while the platen roller advances print media advances in a print direction substantially perpendicular to such burn line or lateral print axis.

As discussed herein, the verifier module includes an image sensor with an array of photo sensors. The image sensor is configured to capture a representation of at least a portion of the sequential segments of the image printed on the print media. With the verifier module removably coupled to the printer (e.g. to the media cover), magnetic force acting between the verifier-coupling and the printer-coupling at least in part operates to align the array of photo sensors to a fixed scanning position relative to the array of print elements. In some embodiments, a combination of magnetic force together with verifier-fittings mated to printer-fittings operate to align the array of photo sensors to a fixed scanning position relative to the array of print elements. In some embodiments, magnetic force alone operates to align the array of photo sensors to a fixed scanning position relative to the array of print elements.

Figure 8:
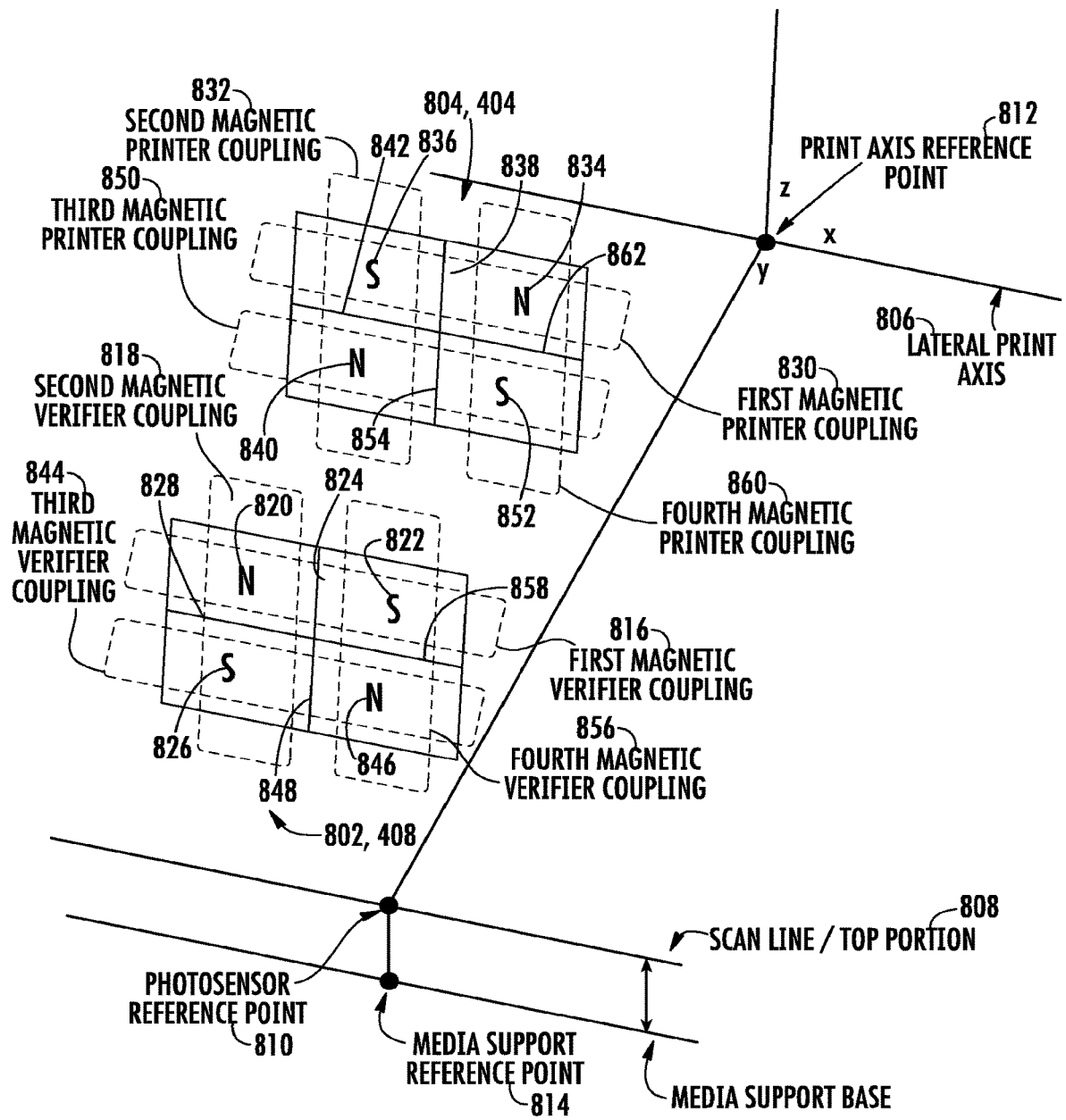
FIG. 8 schematically illustrates an exemplary printer-coupling magnetic array and corresponding verifier-coupling magnetic array.

FIG. 8 schematically illustrates an exemplary alignment 800 of the array of photo sensors to a fixed scanning position relative to the array of print elements. A removably couplable printer and verifier assembly includes a verifier-coupling 408 and a printer-coupling 404. The verifier-coupling 408 may include a verifier-coupling magnetic array 802, and the printer-coupling 404 may include a printer-coupling magnetic array 804. One or more magnets or electromagnets or magnetic materials may be arranged to provide a magnetic array. Such a magnetic array may be included in a verifier-coupling magnetic array and/or a printer-coupling magnetic array. Exemplary magnetic arrangements are discussed herein with respect to FIGS. 9A and 9B, 10A and 10B, 11A and 11B, 12A and 12B. Any one or more of these exemplary magnetic arrangements may be configured to provide a verifier-coupling magnetic array 802 or a printer-coupling magnetic array 804. Additional arrangements for a verifier-coupling magnetic array 802 or a printer-coupling magnetic array 804 will be appreciated by those skilled in the art, all of which are within the spirit and scope of the present disclosure. As discussed, herein, the verifier-coupling magnetic array 802 and the printer-coupling magnetic array 804 may be configured to align the array of photo sensors to a fixed scanning position relative to the array of print elements.

In some embodiments, a fixed scanning position may be characterized with respect to a lateral print axis 806 and a scan line 808. An array of print elements 706 in a printhead 702 are typically aligned substantially parallel to the lateral print axis 806 and perpendicular to the print direction, and an array of photo sensors in a verifier module 200 are typically oriented parallel to the scan line 808 and perpendicular to the print direction. Thus, a fixed scanning position may include a scan line 808 substantially parallel to a lateral print axis 806. The fixed scanning position may be characterized using a cartesian coordinate system. For example, as shown in FIG. 8, the lateral print axis may be characterized as an "X" axis, and a "Y" axis may be characterized by a first distance between the lateral print axis and the scan line, and a "Z" axis orthogonal to the "Y" axis may be characterized by a second distance between the scan line and a reference point on the media support 202.

The fixed scanning position may include the scan line being at a fixed point on the "X" axis relative to the lateral print axis 806, a fixed point on the "Y" axis relative to the lateral print axis 806, and/or a fixed point on the "Z" axis relative to the media support 202. For example, a photo sensor reference point 810 corresponding to an array of photosensors may have fixed X, Y, and Z coordinates relative to a print axis reference point 812 corresponding to the lateral print axis. Additionally, a photo sensor reference point 810 may have fixed X, Y, and Z coordinates relative to a media support reference point 814 corresponding to the media support, such that the photosensor reference point is a fixed distance from the media support reference point. The fixed distance between photosensor reference point and the media support reference point may be selected to provide suitable space for advancing print media to move between the verifier module 200 and the media support 202.

The fixed scanning position of the photo sensor reference point relative to the print axis reference point and/or the media support reference point may be provided by the verifier-coupling 408 being removably coupled to the printer-coupling 404. For example, magnetic force acting between the verifier coupling (e.g., from one or more magnets, electromagnets, or magnetic materials arranged to provide a verifier-coupling magnetic array 804) and the printer-coupling (e.g., from one or more magnets, electromagnets, or magnetic materials arranged to provide a printer-coupling magnetic array 802) operates to align the array of photo sensors to a fixed scanning position relative to the array of print elements.

The verifier-coupling magnetic array 804 and the printer-coupling magnetic array 802 may be configured to use magnetic force to resist movement of the verifier module 202 when removably coupled to the printer at the verifier receiving space 400. The verifier-coupling magnetic array 804 and the printer-coupling magnetic array 802 may be configured so that the magnetic force resists movement in one or more directions. For example, a first magnetic verifier-coupling of the verifier-coupling magnetic array may interface with a first magnetic printer-coupling of the printer-coupling magnetic array, to provide magnetic force that resists movement in a first direction. A second magnetic verifier-coupling of the verifier-coupling magnetic array may interface with a second magnetic printer-coupling of the printer-coupling magnetic array, to provide magnetic force that resists movement in a second direction. The first direction and the second direction may be perpendicular to one another. The sum of these magnetic forces resisting movement in the first direction and the second direction may additionally resist movement in any direction around a 360-degree plane between the interface of the verifier-coupling magnetic array 802 and the printer-coupling magnetic array 804. Additionally, or in the alternative, further magnetic verifier-couplings of the verifier-coupling magnetic array may be provided to interface with corresponding further magnetic printer-couplings of the printer-coupling magnetic array, to provide magnetic force that further resists movement in respective directions.

As shown in FIG. 8, a verifier-coupling magnetic array may include a first magnetic verifier-coupling 816 and a second magnetic verifier coupling 818.

The first magnetic-verifier-coupling 816 has a north-polarity magnetic surface 820 adjacent to and abutting a south-polarity magnetic surface 822 along a first verifier-coupling magnetic border 824. The second magnetic verifier-coupling having a north-polarity magnetic surface 820 adjacent to and abutting a south-polarity magnetic surface 826 along a second verifier-coupling magnetic border 828.

Likewise, a printer-coupling magnetic array may include a corresponding first magnetic printer-coupling 830 and a second magnetic printer-coupling 832. The first magnetic printer-coupling 830 has a north-polarity magnetic surface 834 adjacent to and abutting a south-polarity magnetic surface 836 along a first printer-coupling magnetic border 838. The second magnetic printer-coupling 832 has a north-polarity magnetic surface 840 adjacent to and abutting a south-polarity magnetic surface 836 along a second printer-coupling magnetic border 842.

The first magnetic printer-coupling 830 may be configured to removably couple with the first magnetic verifier-coupling 816. In some embodiments, magnetic force acting between the first magnetic verifier-coupling 816 and the first magnetic printer-coupling 830 operates to position and hold the verifier module so that the photo sensor reference point substantially aligns laterally along the "X" axis with respect to the print axis reference point. The second magnetic printer-coupling 832 may be configured to removably couple with the second magnetic verifier-coupling 818. In some embodiments, magnetic force acting between the second magnetic verifier-coupling 818 and the second magnetic printer-coupling 832 operates to position and hold the photo sensor reference point substantially at the fixed distance along the "Z" axis from the media support reference point 814 and/or at a fixed distance along the "Z" axis relative to the print axis reference point 812.

In some embodiments, a verifier-coupling magnetic array may optionally include a third magnetic verifier-coupling 844, as shown in FIG. 8. The third magnetic verifier-coupling 844 has a north-polarity magnetic surface 846 adjacent to and abutting a south-polarity magnetic surface 826 along a third verifier-coupling magnetic border 848. Likewise, in some embodiments, a printer-coupling magnetic array may optionally include a third magnetic printer-coupling 850 having a north-polarity magnetic surface 840 adjacent to and abutting a south-polarity magnetic surface 852 along a third printer-coupling magnetic border 854. The third magnetic printer-coupling 850 may be configured to removably couple with the third magnetic verifier-coupling 844. In some embodiments, magnetic force acting between the third magnetic verifier-coupling 844 and the third magnetic printer-coupling 850 further operates to position and hold the photo sensor reference point substantially aligned laterally along the "X" axis with respect to the print axis reference point.

In some embodiments, a verifier-coupling magnetic array may optionally include a fourth magnetic verifier-coupling 856. The fourth magnetic verifier-coupling 856 has a north-polarity magnetic surface 846 adjacent to and abutting a south-polarity magnetic surface 822 along a fourth verifier-coupling magnetic border 858. Likewise, in some embodiments, a printer-coupling magnetic array may optionally include a fourth magnetic printer-coupling 860 having a north-polarity magnetic surface 834 adjacent to and abutting a south-polarity magnetic surface 852 along a fourth printer-coupling magnetic border 862. The fourth magnetic printer-coupling 860 may be configured to removably couple with the fourth magnetic verifier-coupling 856. In some embodiments, magnetic force acting between the fourth magnetic verifier-coupling 856 and the fourth magnetic printer-coupling 860 further operates to position and hold the photo sensor reference point substantially at the fixed distance along the "Z" axis from the media support reference point 814 and/or at a fixed distance along the "Z" axis relative to the print axis reference point 812.

In some embodiments, at least a portion of a first magnetic verifier-coupling and at least a portion of a second magnetic verifier-coupling share a north-polarity magnetic surface and/or a south-polarity magnetic surface. Likewise, in some embodiments, at least a portion of a first magnetic printer-coupling and at least a portion of a second magnetic printer-coupling share a north-polarity magnetic surface and/or a south-polarity magnetic surface.

By way example, in some embodiments, at least a portion of the first magnetic verifier-coupling and at least a portion of the second magnetic verifier-coupling may share a north-polarity magnetic surface and/or a south-polarity magnetic surface. Additionally, or in the alternative, at least a portion of the second magnetic verifier-coupling and at least a portion of the third magnetic verifier-coupling may share a north-polarity magnetic surface and/or a south-polarity magnetic surface. Further in addition or in the alternative, at least a portion of the third magnetic verifier-coupling and at least a portion of the fourth magnetic verifier-coupling may share a north-polarity magnetic surface and/or a south-polarity magnetic surface. Even further in addition or in the alternative, at least a portion of the fourth magnetic verifier-coupling and at least a portion of the first magnetic verifier-coupling may share a north-polarity magnetic surface and/or a south-polarity magnetic surface.

Likewise, in some embodiments, at least a portion of the first magnetic printer-coupling and at least a portion of the second magnetic printer-coupling may share a north-polarity magnetic surface and/or a south-polarity magnetic surface. Additionally, or in the alternative, at least a portion of the second magnetic printer-coupling and at least a portion of the third magnetic printer-coupling may share a north-polarity magnetic surface and/or a south-polarity magnetic surface. Further in addition or in the alternative, at least a portion of the third magnetic printer-coupling and at least a portion of the fourth magnetic printer-coupling may share a north-polarity magnetic surface and/or a south-polarity magnetic surface. Even further in addition or in the alternative, at least a portion of the fourth magnetic printer-coupling and at least a portion of the first magnetic printer-coupling may share a north-polarity magnetic surface and/or a south-polarity magnetic surface.

For example, as shown in FIG. 8, the first magnetic verifier-coupling shares a north-polarity magnetic surface with the second magnetic verifier-coupling and a south-polarity magnetic surface with the fourth magnetic verifier-coupling. Likewise, the first magnetic printer-coupling shares a south-polarity magnetic surface with the second magnetic printer-coupling and a north-polarity magnetic surface with the fourth magnetic printer-coupling.

As additionally shown in FIG. 8, the third magnetic verifier-coupling shares a south-polarity magnetic surface with the second magnetic verifier-coupling and a north-polarity magnetic surface with the fourth magnetic verifier-coupling. Likewise, the third magnetic printer-coupling shares a north-polarity magnetic surface with the second magnetic printer-coupling and a south-polarity magnetic surface with the fourth magnetic printer-coupling.

Figure 9A:
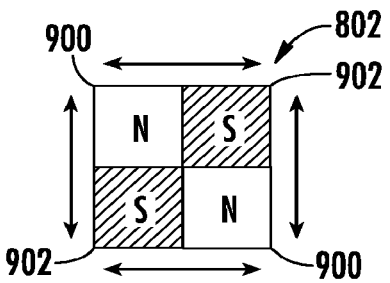
FIGS. 9A and 9B schematically illustrate an exemplary magnetic arrangement for a printer coupling and corresponding verifier-coupling.
Figure 9B:
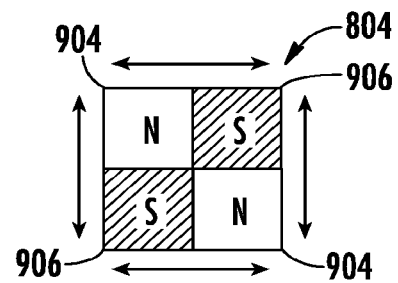

Any one or more of these exemplary magnetic arrangements may be configured to provide a verifier-coupling magnetic array 802 or a printer-coupling magnetic array 804. In some embodiments, a verifier-coupling magnetic array 802. As shown in FIG. 9A, a verifier-coupling magnetic array 804 may be configured as a 4×4 grid of alternating north-polarity magnetic surfaces 900 and south-polarity magnetic surfaces 902. As shown in FIG. 9B, a corresponding printer-coupling magnetic array 804 may be similarly configured as a 4×4 grid of alternating north-polarity magnetic surfaces 904 and south-polarity magnetic surfaces 906. The north-polarity magnetic surfaces of the verifier-coupling magnetic array interface with the south-polarity magnetic surfaces of the printer-coupling magnetic array. Likewise, the south-polarity magnetic surfaces of the verifier-coupling magnetic array interface with the north-polarity magnetic surfaces of the printer-coupling magnetic array. Magnetic borders between adjacent and abutting opposite polarities on the verifier-coupling magnetic array and magnetic borders between adjacent and abutting opposite polarities on the printer-coupling magnetic array resist movement of the verifier module when removably coupled to the verifier receiving space.

Figure 10A:
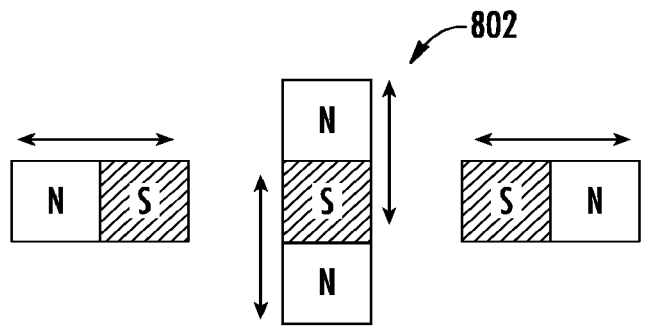
FIGS. 10A and 10B schematically illustrate another exemplary magnetic arrangement for a printer coupling and corresponding verifier-coupling.
Figure 10B:
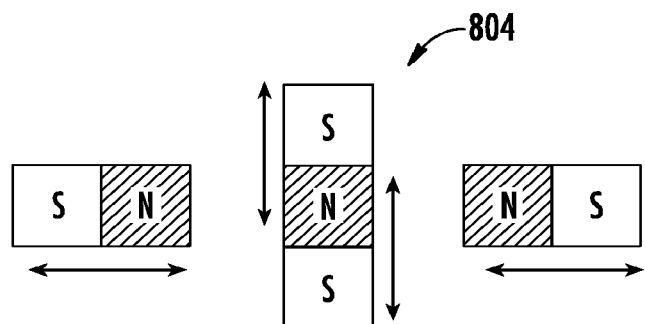

FIGS. 10A and 10B show an alternative embodiment for a verifier-coupling magnetic array and a printer-coupling magnetic array, respectively.

Figure 11A:
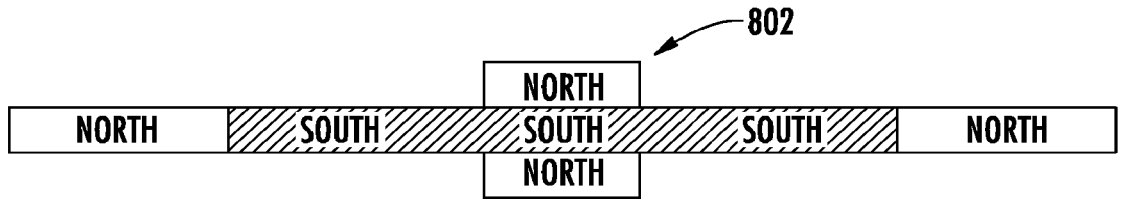
FIGS. 11A and 11B schematically illustrate another exemplary magnetic arrangement for a printer coupling and corresponding verifier-coupling.
Figure 11B:
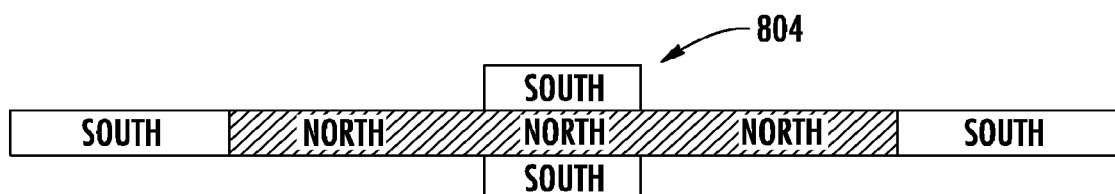

FIGS. 11A and 11B respectively show yet another alternative embodiment for a verifier-coupling magnetic array and a printer-coupling magnetic array.

Figure 12A:
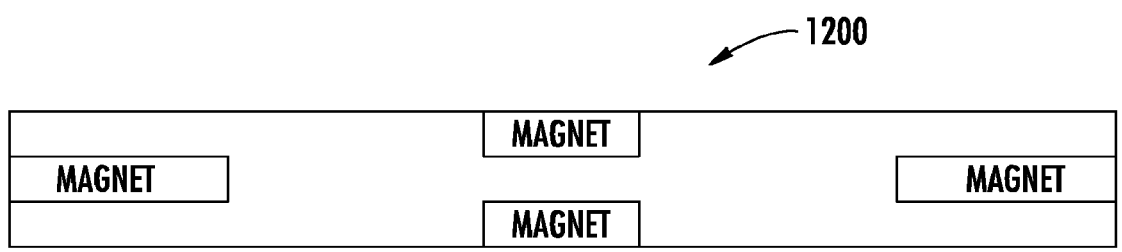
FIGS. 12A and 12B schematically illustrate another exemplary magnetic arrangement for a printer-coupling and corresponding verifier-coupling.
Figure 12B:
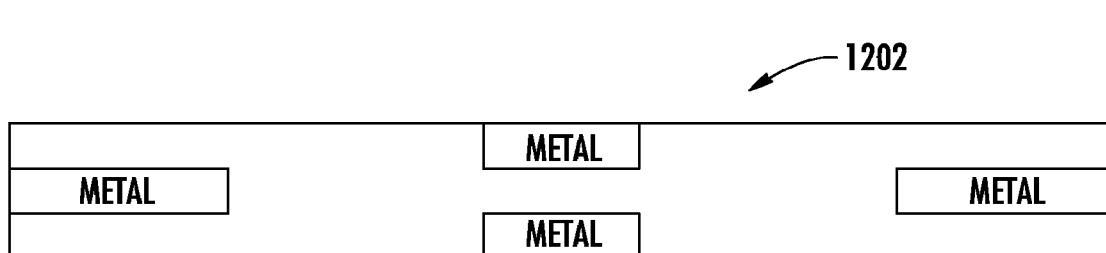

FIGS. 12A and 12B respectively show yet another alternative embodiment for a verifier-coupling and a printer-coupling. As shown, in some embodiments, the verifier coupling may include one or more magnets or electromagnets (e.g., a verifier-coupling magnetic array) while the printer-coupling includes a metallic material that is attracted to a magnetic field from the plurality of magnets or electromagnets. Alternatively, in some embodiments, the verifier coupling may include the metallic material, while the printer-coupling includes the one or more magnets or electromagnets (e.g., a verifier-coupling magnetic array).

While particular magnet configurations have been described, it is to be understood that other magnet arrangements may be used (circular pattern, rectangular, etc.), including difference size magnets and different surface configurations, all of which are within the spirit and scope of the present disclosure.

Embodiments that include one or more magnets or electro magnets, such as arranged in a magnetic array, may also include one or more fittings. A verifier module may include a verifier-coupling that includes one or more verifier-fittings, and a verifier receiving space may include a printer-coupling that includes one or more printer-fittings. The one or more verifier-fittings and the one or more printer-fittings may be respectively configured to fittingly mate with one another, aiding alignment of the array of photo sensors to the fixed scanning position. For example, verifier-fittings and/or printer-fittings may be combined with the embodiments shown in FIGS. 9A and 9B, 10A and 10B, 11A and 11B, or 12A and 12B. Other combinations will be appreciated by those skilled in the art, all of which are within the spirit and scope of the present disclosure.

FIGS. 13A and 13B show an exemplary verifier-fitting and corresponding printer-fitting. FIG. 13A shows an exemplary protrusion 1300 FIG. 13B shows an exemplary recess 1302. The protrusion 1300 and recess 1302 are configured to fittingly mate with one another. In some embodiments, the protrusion 1300 may be included in a verifier-fitting and the recess may be included in a printer-fitting. Alternatively, or in addition, the protrusion 1300 may be included in a printer-fitting and the recess may be included in a verifier-fitting. In some embodiments, a surface of a verifier-fitting and/or a surface of a printer-fitting may include one or more magnets or electromagnets (e.g. a magnetic array) 1304, 1306 together with one or more protrusions 1300 and corresponding recesses 1302. In some embodiments, the one or more protrusions 1300 and/or the one or more recesses 1302 may be magnetic.

In some embodiments, a verifier module includes a verifier communication module configured to allow the verifier to send and receive communications. Such communications may include data pertaining to scans of printed images obtained by the image sensor, and other communications pertaining to the operation of the verifier module. In some embodiments, the printer includes a printer communication module. The printer communication module may be configured to allow the verifier module and the printer to communicate with one another. The verifier may include a verifier-communication interface and printer may include a printer-communication interface. The verifier-communication interface and the printer-communication interface may be configured to provide a communication link allowing communications to be transmitted between the verifier module and the printer. The communication link may be configured for wired or wireless communications.

FIGS. 14A-14C schematically illustrate cross-sectional views of additional exemplary verifier-fittings and/or corresponding printer-fittings. FIG. 14A shows a cross-sectional view 1400 of the verifier-fitting and/or the corresponding printer-fittings of FIGS. 13A and 13B. As shown in FIGS. 14B and 14C, in some embodiments, power or communications may be supplied through an interface incorporated into the verifier-fitting and/or corresponding printer-fitting. For example, as shown in FIG. 14B, a verifier-fitting and corresponding printer-fitting 1402 may include a verifier-communication interface and/or printer-communication interface 1404. The printer-communication interface and the verifier-communication interface may be configured to provide communications between the verifier and the printer at least in part by a communication link between the printer-power interface and the verifier-power interface.

Alternatively, as shown in FIG. 14B, a verifier-fitting and corresponding printer-fitting 1402 may include a verifier-power interface and/or printer-communication power 1404. The printer-power interface and the verifier-power interface may be configured to supply electrical power to the verifier at least in part by an electrical connection between the printer-power interface and the verifier-power interface.

As shown in FIG. 14C, in some embodiments, a verifier-fitting and corresponding printer-fitting 1402 may include both a verifier-communication interface and/or printer-communication interface 1406, and a verifier-power interface and/or printer-power interface 1408.

A verifier-coupling may include at least a portion of the verifier-communication interface, and a printer-coupling may include at least a portion of the printer-communication interface. Alternatively, a verifier-communication interface may be provided separately from a verifier-coupling, and/or a printer-communication interface may be provided separately from a printer-coupling.

A verifier-coupling may include at least a portion of the verifier-power interface, and a printer-coupling may include at least a portion of the printer-power interface. Alternatively, a verifier-power interface may be provided separately from a verifier-coupling, and/or a printer-power interface may be provided separately from a printer-coupling.

Figure 15:
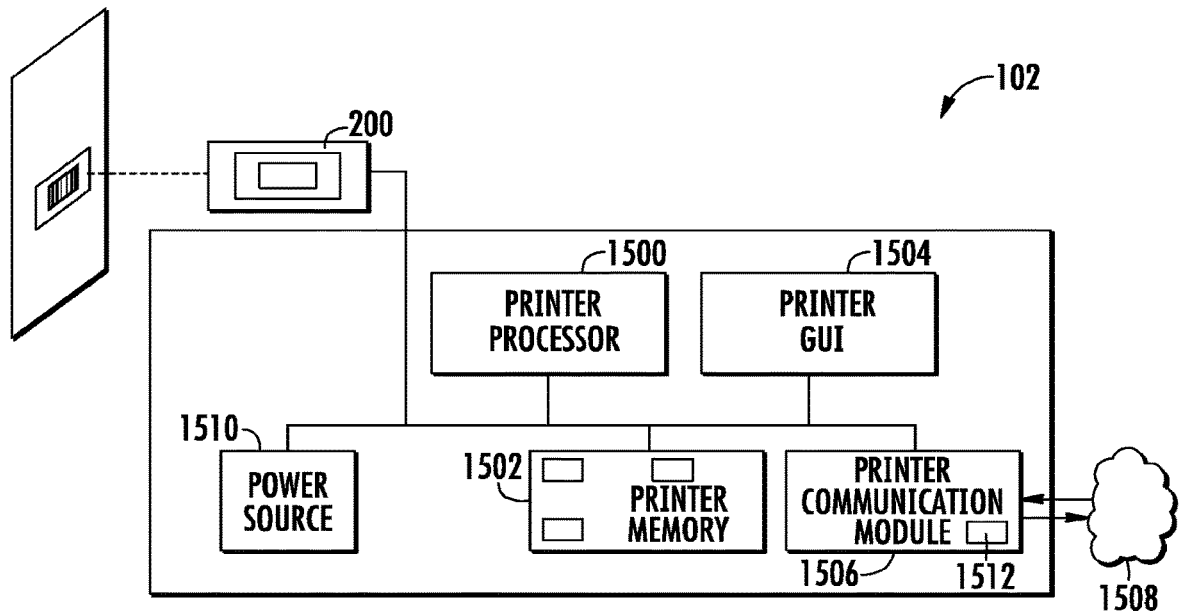
FIG. 15 schematically illustrates a block diagram of an exemplary printer according to various embodiments of the present disclosure.

FIG. 15 schematically illustrates a block diagram of an exemplary printer 102. The printer 102 includes a processor 1500, memory 1502, and a graphical user interface 1504. The printer additionally includes a printer communication module 1506, which may be configured to communicate with a verifier module 200 using a printer-communication interface 1508. The printer additionally includes a power source 1510.

Figure 16:
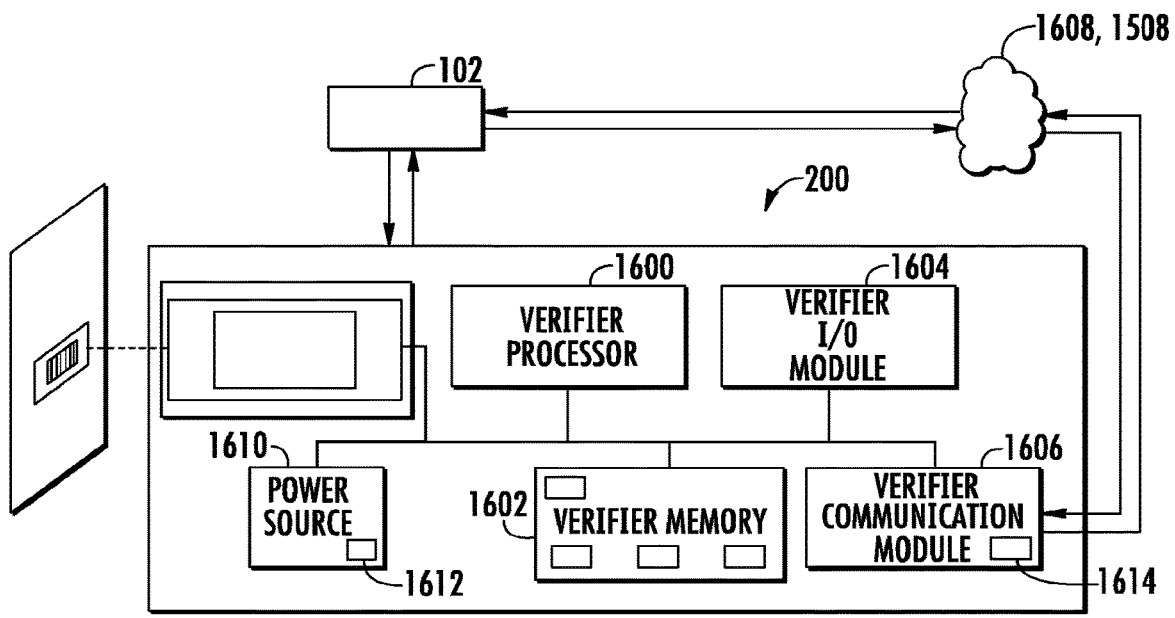
FIG. 16 schematically illustrates a block diagram of an exemplary verifier according to various embodiments of the present disclosure.

FIG. 16 schematically illustrates a block diagram of an exemplary verifier module 200. The verifier module 200 includes a processor 1600, memory 1602, and a verifier I/O module 1604. The verifier module additionally includes a verifier communication module 1606, which may be configured to communicate with the printer 102 using a verifier-communication interface 1608. The verifier module additionally includes a verifier power source 1610. The verifier power source may include a battery or a capacitor or supercapacitor.

The printer communication module and the verifier communication module may be configured to communicate with one another, such as by a communication link between the verifier-communication interface and the printer-communication interface. The verifier communication module and the printer communication module may be configured to communicate with one another wirelessly.

In some embodiments, the verifier power source 1610 may include a wireless energy harvesting node 1612. The wireless energy harvesting node may include one or more energy harvesting circuits. An energy harvesting circuit may be configured to harvest energy from a wireless signal or a low current power source such as a powered Ethernet cable or USB port.

In some embodiments, the printer communication module 1506 may include a wireless communication module 1512. The verifier communication module 1606 may also include a wireless communication module 1614. The printer communication module may be configured to communicate with the verifier communication module wirelessly using a wireless signal transmitted between the respective wireless communication modules 1512, 1614. In some embodiments, the wireless energy harvesting node 1612 may include an energy harvesting circuit configured to harvest energy from a wireless signal transmitted by a wireless communication module 1512 in the printer.

A verifier and printer assembly may include a first wireless communication module located in the printer and a second wireless communication system located in the verifier module. In some embodiments, upon removably coupling the verifier module and the printer, a wireless signal is sent from the first wireless communication system to the second wireless communication system to exchange data between the printer and the verifier module.

The present disclosure embraces various methods pertaining to the removably couplable printer and verifier assemblies disclosed herein.

Figure 17:
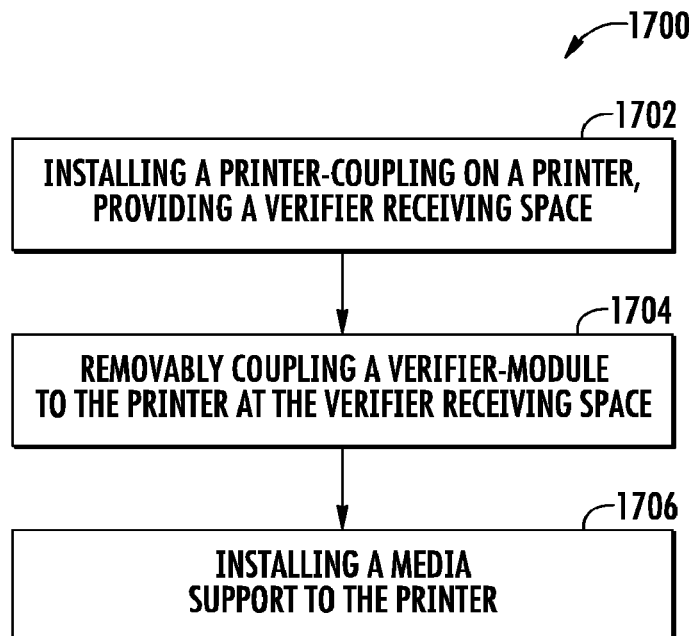
FIG. 17 shows a method of integrating a verifier module with printer, providing a removably couplable printer and verifier assembly.

FIG. 17 shows a method of integrating a verifier module with printer 1700, providing a removably couplable printer and verifier assembly. The method includes installing a printer-coupling 404 on a printer 1702, providing a verifier receiving space 400, and removably coupling a verifier-module 200 to the printer at the verifier receiving space 1704, where the verifier module has a verifier-coupling coupling configured to releasably couple with the printer-coupling. In some embodiments the verifier module also has a verifier-fitting and the verifier receiving space has a printer-fitting, where the verifier-fitting and the printer-fitting are configured to fittingly mate with one another. In some embodiments, the method further includes installing a media support to the printer 1706.

Figure 18:
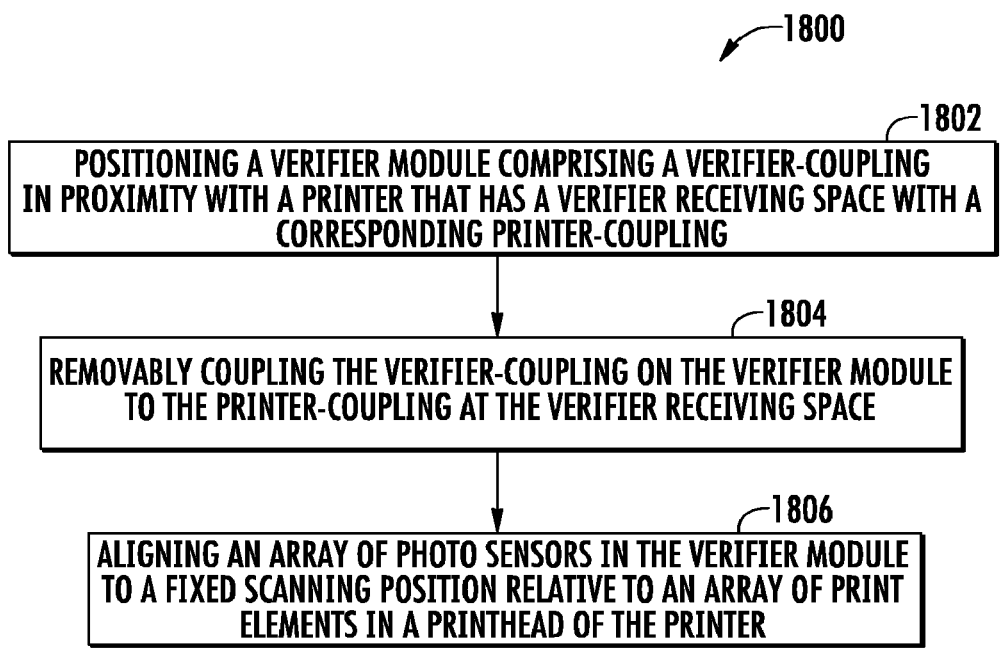
FIG. 18 shows a method of removably coupling a verifier module to a printer.

FIG. 18 shows a method of removably coupling a verifier module to a printer 1800. The method includes positioning a verifier module that has a verifier-coupling 402 in proximity with a printer that has verifier receiving space with a corresponding printer-coupling 1802. The verifier-receiving space 200 may be provided at a portion of a printer case, enclosure or chassis, such as a media cover or door. The verifier-receiving space (e.g., on a media cover) includes a printer-coupling 404. The verifier-coupling and/or the printer-coupling may include one or more magnets configured to supply magnetic force. The method 1800 continues with removably coupling the verifier-coupling on the verifier module to the printer-coupling at the verifier receiving space 1804. The verifier-coupling may be removably coupled to the printer-coupling at least in part by magnetic force acting between the verifier-coupling and the printer-coupling. The removably couplable verifier module provides a removably couplable printer and verifier assembly With the verifier module removably coupled to the printer, the printer and verifier assembly provides an array of photo sensors in the verifier module aligned to a fixed scanning position relative to an array of print elements in a printhead of the printer. For example, a printer may have a printhead with an array of print elements configured to print sequential segments of an image on corresponding sequential segments of a print media. The printer may additionally include a platen roller configured to advance the print media when printing the sequential segments. The verifier module may include an image sensor with an array of photo sensors configured to capture a representation of at least a portion of the sequential segments of the image printed on the print media as the platen roller advances the print media past the array of photo sensors.

The array of photo sensors may be aligned to a fixed scanning position relative to the array of print elements at least in part by magnetic force acting between the verifier-coupling and the printer-coupling. The array of photo sensors may be oriented substantially parallel to a lateral print axis corresponding to the array of print elements.

In some embodiments, the verifier module may further include one or more verifier-fittings, and the media cover may further include one or more printer-fittings. Removably coupling the verifier module to the media cover may include fittingly mating the one or more verifier-fittings and the one or more printer-fittings with one another.

When removably coupled to a printer, a verifier module may be configured to have a fixed scanning position, such that an array of photo sensors in the verifier align with or relative to an array of print elements in the printer. In some embodiments, magnetic force alone operates to align the array of photo sensors to a fixed scanning position relative to the array of print elements. The verifier module is removable between the fixed scanning position and a removed or undocked position. The removed or undocked position reflects a position where the verifier module is removed from the printer and a magnetic connection between the verifier module and the printer has been disengaged.

The verifier module, when removably coupled to the printer, auto-aligns to the fixed scanning position. For example, magnetic force may allow the verifier module to be removably coupled to the printer in a snapping manner. If the verifier module is slightly misaligned when being removably coupled to the printer, the magnetic force may snap the verifier module into the fixed scanning position. When the verifier module is in the fixed scanning position, the image sensor in the verifier module may scan the correct portion of the printed medium to verify print quality and identify printing errors. Additionally, the verifier module does not obstruct the print media from moving through the media space between the verifier module and the media support. The verifier module auto-aligns to the fixed scanning position when the magnets are configured as described in accordance with the present disclosure, including as shown in FIG. 8 and accordingly described.

Figure 19:
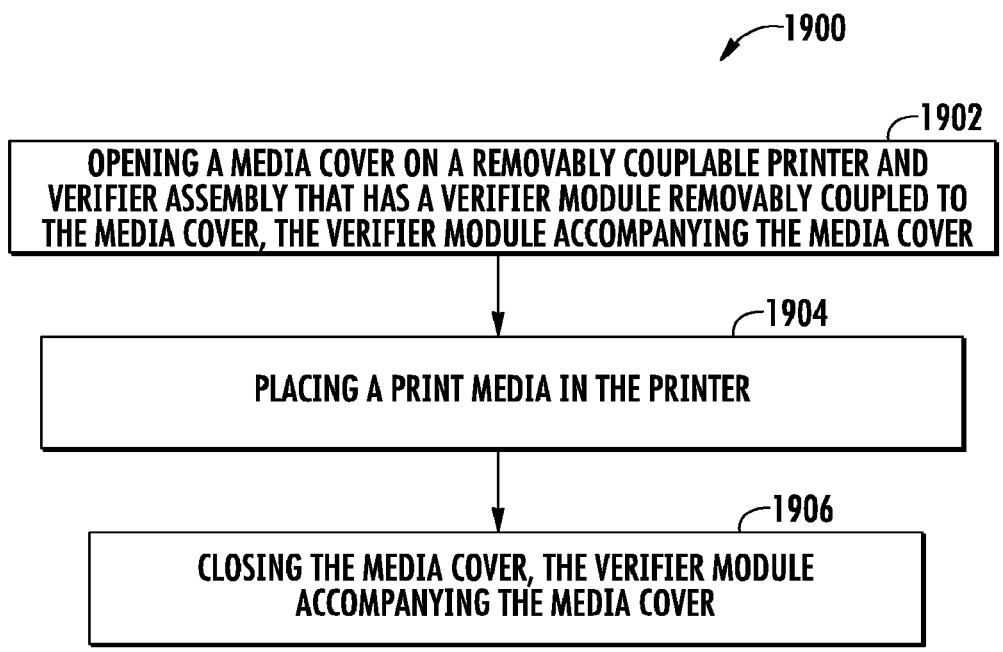
FIG. 19 shows a method of installing or changing print media in a printer that has a removably couplable a verifier module.

FIG. 19 shows a method of installing or changing print media in a removably couplable printer and verifier assembly 1900. The method includes opening a media cover on a removably couplable printer and verifier assembly 1902. The media cover may be configured to pivot from a closed position (as shown in FIG. 1) to an open position (as shown in FIGS. 3A and 3B). The media cover also may be configured to be removed from the printer or otherwise to provide access to the various internal components of the printer. The verifier assembly includes a verifier module 200 removably coupled to the media cover. Thus, the verifier module 200, being removably coupled to the media cover, accompanies the media cover as the media cover is pivoted from the open position to the closed position or otherwise removed to provide access to the various internal components of the printer.

The method 1900 continues with placing a print media in the printer 1904. The printer may be configured such that the print media may follow a media path. In some embodiments, the print media may be threaded along a media path. After the print media has been placed in the printer, the method continues with closing the media cover 1906. The verifier module 200, being removably coupled to the media cover, accompanies the media cover as the media cover is pivoted from the closed position to the open position or otherwise returned to cover the various internal components of the printer.

Various embodiments of the present disclosure provide easy, tool free mounting of a verifier module to a printer (and the printer to the verifier) such that the verifier module is removably coupled to the printer. Various embodiments improve setup of a verifier and printer assembly. Various embodiments also enable a verifier to communicate wirelessly a printer, which in some embodiments eliminates the need for cables or wire, which sometimes require technical skill to install. Various embodiments enable an easy upgrade to a printer to add a verifier module and associated functionalities. In accordance with the present disclosure, typically, a user can install (e.g., removably couple) a verifier to a printer without technical skill and tools. Various embodiments provide a secure removable coupling, mounting, or connection of the verifier module to the printer such that the verifier typically does not move about or disengage from the printer with the usual vibrations or jarring that tends to happen in various operating environments where the verifier and printer assembly may be deployed. Additionally, various embodiments provide a fixed scanning position for the verifier module, which substantially ensures that the verifier module will scan the correct portion of the printed media and not obstruct the media path.

To supplement the present disclosure, this application incorporates entirely by reference the following commonly assigned patents, patent application publications, and patent applications:

U.S. Pat. Nos. 6,832,725; 7,128,266; 7,159,783; 7,413,127; 7,726,575; 8,294,969; 8,317,105; 8,322,622; 8,366,005; 8,371,507; 8,376,233; 8,381,979; 8,390,909; 8,408,464; 8,408,468; 8,408,469; 8,424,768; 8,448,863; 8,457,013; 8,459,557; 8,469,272; 8,474,712; 8,479,992; 8,490,877; 8,517,271; 8,523,076; 8,528,818; 8,544,737; 8,548,242; 8,548,420; 8,550,335; 8,550,354; 8,550,357; 8,556,174; 8,556,176; 8,556,177; 8,559,767; 8,599,957; 8,561,895; 8,561,903; 8,561,905; 8,565,107; 8,571,307; 8,579,200; 8,583,924; 8,584,945; 8,587,595; 8,587,697; 8,588,869; 8,590,789; 8,596,539; 8,596,542; 8,596,543; 8,599,271; 8,599,957; 8,600,158; 8,600,167; 8,602,309; 8,608,053; 8,608,071; 8,611,309; 8,615,487; 8,616,454; 8,621,123;

8,622,303; 8,628,013; 8,628,015; 8,628,016; 8,629,926; 8,630,491; 8,635,309; 8,636,200; 8,636,212; 8,636,215; 8,636,224; 8,638,806; 8,640,958; 8,640,960; 8,643,717; 8,646,692; 8,646,694; 8,657,200; 8,659,397; 8,668,149; 8,678,285; 8,678,286; 8,682,077; 8,687,282; 8,692,927; 8,695,880; 8,698,949; 8,717,494; 8,717,494; 8,720,783; 8,723,804; 8,723,904; 8,727,223; 8,740,082; 8,740,085; 8,746,563; 8,750,445; 8,752,766; 8,756,059; 8,757,495; 8,760,563; 8,763,909; 8,777,108; 8,777,109; 8,779,898; 8,781,520; 8,783,573; 8,789,757; 8,789,758; 8,789,759; 8,794,520; 8,794,522; 8,794,525; 8,794,526; 8,798,367; 8,807,431; 8,807,432; 8,820,630; 8,822,848; 8,824,692; 8,824,696; 8,842,849; 8,844,822; 8,844,823; 8,849,019; 8,851,383; 8,854,633; 8,866,963; 8,868,421; 8,868,519; 8,868,802; 8,868,803; 8,870,074; 8,879,639; 8,880,426; 8,881,983; 8,881,987; 8,903,172; 8,908,995; 8,910,870; 8,910,875; 8,914,290; 8,914,788; 8,915,439; 8,915,444; 8,916,789; 8,918,250; 8,918,564; 8,925,818; 8,939,374; 8,942,480; 8,944,313; 8,944,327; 8,944,332; 8,950,678; 8,967,468; 8,971,346; 8,976,030; 8,976,368; 8,978,981; 8,978,983; 8,978,984; 8,985,456; 8,985,457; 8,985,459; 8,985,461; 8,988,578; 8,988,590; 8,991,704; 8,996,194; 8,996,384; 9,002,641; 9,007,368; 9,010,641; 9,015,513; 9,016,576; 9,022,288; 9,030,964; 9,033,240; 9,033,242; 9,036,054; 9,037,344; 9,038,911; 9,038,915; 9,047,098; 9,047,359; 9,047,420; 9,047,525; 9,047,531; 9,053,055; 9,053,378; 9,053,380; 9,058,526; 9,064,165; 9,064,165; 9,064,167; 9,064,168; 9,064,254; 9,066,032; 9,070,032; 9,076,459; 9,079,423; 9,080,856; 9,082,023; 9,082,031; 9,084,032; 9,087,250; 9,092,681; 9,092,682; 9,092,683; 9,093,141; 9,098,763; 9,104,929; 9,104,934; 9,107,484; 9,111,159; 9,111,166; 9,135,483; 9,137,009; 9,141,839; 9,147,096; 9,148,474; 9,158,000; 9,158,340; 9,158,953; 9,159,059; 9,165,174; 9,171,543; 9,183,425; 9,189,669; 9,195,844; 9,202,458; 9,208,366; 9,208,367; 9,219,836; 9,224,024; 9,224,027; 9,230,140; 9,235,553; 9,239,950; 9,245,492; 9,248,640; 9,250,652; 9,250,712; 9,251,411; 9,258,033; 9,262,633; 9,262,660; 9,262,662; 9,269,036; 9,270,782; 9,274,812; 9,275,388; 9,277,668; 9,280,693; 9,286,496; 9,298,964; 9,301,427; 9,313,377; 9,317,037; 9,319,548; 9,342,723; 9,361,882; 9,365,381; 9,373,018; 9,375,945; 9,378,403; 9,383,848; 9,384,374; 9,390,304; 9,390,596; 9,411,386; 9,412,242; 9,418,269; 9,418,270; 9,465,967; 9,423,318; 9,424,454; 9,436,860; 9,443,123; 9,443,222; 9,454,689; 9,464,885; 9,465,967; 9,478,983; 9,481,186; 9,487,113; 9,488,986; 9,489,782; 9,490,540; 9,491,729; 9,497,092; 9,507,974; 9,519,814; 9,521,331; 9,530,038; 9,572,901; 9,558,386; 9,606,581; 9,646,189; 9,646,191; 9,652,648; 9,652,653; 9,656,487; 9,659,198; 9,680,282; 9,697,401; 9,701,140;

U.S. Design Patent No. D702,237; U.S. Design Pat. No. D716,285; U.S. Design Pat. No. D723,560; U.S. Design Pat. No. D730,357; U.S. Design Pat. No. D730,901; U.S. Design Pat. No. D730,902; U.S. Design Pat. No. D734,339; U.S. Design Pat. No. D737,321; U.S. Design Pat. No. D754,205; U.S. Design Pat. No. D754,206; U.S. Design Pat. No. D757,009; U.S. Design Pat. No. D760,719; U.S. Design Pat. No. D762,604; U.S. Design Pat. No. D766,244; U.S. Design Pat. No. D777,166; U.S. Design Pat. No. D771,631; U.S. Design Pat. No. D783,601; U.S. Design Pat. No. D785,617; U.S. Design Pat. No. D785,636; U.S. Design Pat. No. D790,505; U.S. Design Pat. No. D790,546;

International Publication No. 2013/163789; U.S. Patent Application Publication No. 2008/0185432; U.S. Patent Application Publication No. 2009/0134221; U.S. Patent Application Publication No. 2010/0177080; U.S. Patent Application Publication No. 2010/0177076; U.S. Patent Application Publication No. 2010/0177707; U.S. Patent Application Publication No. 2010/0177749; U.S. Patent Application Publication No. 2010/0265880; U.S. Patent Application Publication No. 2011/0202554; U.S. Patent Application Publication No. 2012/0111946; U.S. Patent Application Publication No. 2012/0168511; U.S. Patent Application Publication No. 2012/0168512; U.S. Patent Application Publication No. 2012/0193423; U.S. Patent Application Publication No. 2012/0194692; U.S. Patent Application Publication No. 2012/0203647; U.S. Patent Application Publication No. 2012/0223141; U.S. Patent Application Publication No. 2012/0228382; U.S. Patent Application Publication No. 2012/0248188; U.S. Patent Application Publication No. 2013/0043312; U.S. Patent Application Publication No. 2013/0082104; U.S. Patent Application Publication No. 2013/0175341; U.S. Patent Application Publication No. 2013/0175343; U.S. Patent Application Publication No. 2013/0257744; U.S. Patent Application Publication No. 2013/0257759; U.S. Patent Application Publication No. 2013/0270346; U.S. Patent Application Publication No. 2013/0292475; U.S. Patent Application Publication No. 2013/0292477; U.S. Patent Application Publication No. 2013/0293539; U.S. Patent Application Publication No. 2013/0293540; U.S. Patent Application Publication No. 2013/0306728; U.S. Patent Application Publication No. 2013/0306731; U.S. Patent Application Publication No. 2013/0307964; U.S. Patent Application Publication No. 2013/0308625; U.S. Patent Application Publication No. 2013/0313324; U.S. Patent Application Publication No. 2013/0332996; U.S. Patent Application Publication No. 2014/0001267; U.S. Patent Application Publication No. 2014/0025584; U.S. Patent Application Publication No. 2014/0034734; U.S. Patent Application Publication No. 2014/0036848; U.S. Patent Application Publication No. 2014/0039693; U.S. Patent Application Publication No. 2014/0049120; U.S. Patent Application Publication No. 2014/0049635; U.S. Patent Application Publication No. 2014/0061306; U.S. Patent Application Publication No. 2014/0063289; U.S. Patent Application Publication No. 2014/0066136; U.S. Patent Application Publication No. 2014/0067692; U.S. Patent Application Publication No. 2014/0070005; U.S. Patent Application Publication No. 2014/0071840; U.S. Patent Application Publication No. 2014/0074746; U.S. Patent Application Publication No. 2014/0076974; U.S. Patent Application Publication No. 2014/0097249; U.S. Patent Application Publication No. 2014/0098792; U.S. Patent Application Publication No. 2014/0100813; U.S. Patent Application Publication No. 2014/0103115; U.S. Patent Application Publication No. 2014/0104413; U.S. Patent Application Publication No. 2014/0104414; U.S. Patent Application Publication No. 2014/0104416; U.S. Patent Application Publication No. 2014/0106725; U.S. Patent Application Publication No. 2014/0108010; U.S. Patent Application Publication No. 2014/0108402; U.S. Patent Application Publication No. 2014/0110485; U.S. Patent Application Publication No. 2014/0125853; U.S. Patent Application Publication No. 2014/0125999; U.S. Patent Application Publication No. 2014/0129378; U.S. Patent Application Publication No. 2014/0131443; U.S. Patent Application Publication No. 2014/0133379; U.S. Patent Application Publication No. 2014/0136208; U.S. Patent Application Publication No. 2014/0140585; U.S. Patent Application Publication No. 2014/0152882; U.S. Patent Application Publication No. 2014/0158770; U.S. Patent Application Publication No. 2014/0159869; U.S. Patent Application Publication No. 2014/0166759; U.S. Patent Application Publication No. 2014/0168787; U.S. Patent Application Publication No. 2014/0175165; U.S. Patent Application Publication No. 2014/0191684; U.S. Patent Application Publication No. 2014/0191913; U.S. Patent Application Publication No. 2014/0197304; U.S. Patent Application Publication No. 2014/0214631; U.S. Patent Application Publication No. 2014/0217166; U.S. Patent Application Publication No. 2014/0231500; U.S. Patent Application Publication No. 2014/0247315; U.S. Patent Application Publication No. 2014/0263493; U.S. Patent Application Publication No. 2014/0263645; U.S. Patent Application Publication No. 2014/0270196; U.S. Patent Application Publication No. 2014/0270229; U.S. Patent Application Publication No. 2014/0278387; U.S. Patent Application Publication No. 2014/0288933; U.S. Patent Application Publication No. 2014/0297058; U.S. Patent Application Publication No. 2014/0299665; U.S. Patent Application Publication No. 2014/0332590; U.S. Patent Application Publication No. 2014/0351317; U.S. Patent Application Publication No. 2014/0362184; U.S. Patent Application Publication No. 2014/0363015; U.S. Patent Application Publication No. 2014/0369511; U.S. Patent Application Publication No. 2014/0374483; U.S. Patent Application Publication No. 2014/0374485; U.S. Patent Application Publication No. 2015/0001301; U.S. Patent Application Publication No. 2015/0001304; U.S. Patent Application Publication No. 2015/0009338; U.S. Patent Application Publication No. 2015/0014416; U.S. Patent Application Publication No. 2015/0021397; U.S. Patent Application Publication No. 2015/0028104; U.S. Patent Application Publication No. 2015/0029002; U.S. Patent Application Publication No. 2015/0032709; U.S. Patent Application Publication No. 2015/0039309; U.S. Patent Application Publication No. 2015/0039878; U.S. Patent Application Publication No. 2015/0040378; U.S. Patent Application Publication No. 2015/0049347; U.S. Patent Application Publication No. 2015/0051992; U.S. Patent Application Publication No. 2015/0053769; U.S. Patent Application Publication No. 2015/0062366; U.S. Patent Application Publication No. 2015/0063215; U.S. Patent Application Publication No. 2015/0088522; U.S. Patent Application Publication No. 2015/0096872; U.S. Patent Application Publication No. 2015/0100196; U.S. Patent Application Publication No. 2015/0102109; U.S. Patent Application Publication No. 2015/0115035; U.S. Patent Application Publication No. 2015/0127791; U.S. Patent Application Publication No. 2015/0128116; U.S. Patent Application Publication No. 2015/0133047; U.S. Patent Application Publication No. 2015/0134470; U.S. Patent Application Publication No. 2015/0136851; U.S. Patent Application Publication No. 2015/0142492; U.S. Patent Application Publication No. 2015/0144692; U.S. Patent Application Publication No. 2015/0144698; U.S. Patent Application Publication No. 2015/0149946; U.S. Patent Application Publication No. 2015/0161429; U.S. Patent Application Publication No. 2015/0178523; U.S. Patent Application Publication No. 2015/0178537; U.S. Patent Application Publication No. 2015/0178685; U.S. Patent Application Publication No. 2015/0181109; U.S. Patent Application Publication No. 2015/0199957; U.S. Patent Application Publication No. 2015/0210199; U.S. Patent Application Publication No. 2015/0212565; U.S. Patent Application Publication No. 2015/0213647; U.S. Patent Application Publication No. 2015/0220753; U.S. Patent Application Publication No. 2015/0220901; U.S. Patent Application Publication No. 2015/0227189; U.S. Patent Application Publication No. 2015/0236984; U.S. Patent Application Publication No. 2015/0239348; U.S. Patent Application Publication No. 2015/0242658; U.S. Patent Application Publication No. 2015/0248572; U.S. Patent Application Publication No. 2015/0254485; U.S. Patent Application Publication No. 2015/0261643; U.S. Patent Application Publication No. 2015/0264624; U.S. Patent Application Publication No. 2015/0268971; U.S. Patent Application Publication No. 2015/0269402; U.S. Patent Application Publication No. 2015/0288689; U.S. Patent Application Publication No. 2015/0288896; U.S. Patent Application Publication No. 2015/0310243; U.S. Patent Application Publication No. 2015/0310244; U.S. Patent Application Publication No. 2015/0310389; U.S. Patent Application Publication No. 2015/0312780; U.S. Patent Application Publication No. 2015/0327012; U.S. Patent Application Publication No. 2016/0014251; U.S. Patent Application Publication No. 2016/0025697; U.S. Patent Application Publication No. 2016/0026838; U.S. Patent Application Publication No. 2016/0026839; U.S. Patent Application Publication No. 2016/0040982; U.S. Patent Application Publication No. 2016/0042241; U.S. Patent Application Publication No. 2016/0057230; U.S. Patent Application Publication No. 2016/0062473; U.S. Patent Application Publication No. 2016/0070944; U.S. Patent Application Publication No. 2016/0092805; U.S. Patent Application Publication No. 2016/0101936; U.S. Patent Application Publication No. 2016/0104019; U.S. Patent Application Publication No. 2016/0104274; U.S. Patent Application Publication No. 2016/0109219; U.S. Patent Application Publication No. 2016/0109220; U.S. Patent Application Publication No. 2016/0109224; U.S. Patent Application Publication No. 2016/0112631; U.S. Patent Application Publication No. 2016/0112643; U.S. Patent Application Publication No. 2016/0117627; U.S. Patent Application Publication No. 2016/0124516; U.S. Patent Application Publication No. 2016/0125217; U.S. Patent Application Publication No. 2016/0125342; U.S. Patent Application Publication No. 2016/0125873; U.S. Patent Application Publication No. 2016/0133253; U.S. Patent Application Publication No. 2016/0171597; U.S. Patent Application Publication No. 2016/0171666; U.S. Patent Application Publication No. 2016/0171720; U.S. Patent Application Publication No. 2016/0171775; U.S. Patent Application Publication No. 2016/0171777; U.S. Patent Application Publication No. 2016/0174674; U.S. Patent Application Publication No. 2016/0178479; U.S. Patent Application Publication No. 2016/0178685; U.S. Patent Application Publication No. 2016/0178707; U.S. Patent Application Publication No. 2016/0179132; U.S. Patent Application Publication No. 2016/0179143; U.S. Patent Application Publication No. 2016/0179368; U.S. Patent Application Publication No. 2016/0179378; U.S. Patent Application Publication No. 2016/0180130; U.S. Patent Application Publication No. 2016/0180133; U.S. Patent Application Publication No. 2016/0180136; U.S. Patent Application Publication No. 2016/0180594; U.S. Patent Application Publication No. 2016/0180663; U.S. Patent Application Publication No. 2016/0180678; U.S. Patent Application Publication No. 2016/0180713; U.S. Patent Application Publication No. 2016/0185136; U.S. Patent Application Publication No. 2016/0185291; U.S. Patent Application Publication No. 2016/0186926; U.S. Patent Application Publication No. 2016/0188861; U.S. Patent Application Publication No. 2016/0188939; U.S. Patent Application Publication No. 2016/0188940; U.S. Patent Application Publication No. 2016/0188941; U.S. Patent Application Publication No. 2016/0188942; U.S. Patent Application Publication No. 2016/0188943; U.S. Patent Application Publication No. 2016/0188944; U.S. Patent Application Publication No. 2016/0189076; U.S. Patent Application Publication No. 2016/0189087; U.S. Patent Application Publication No. 2016/0189088; U.S. Patent Application Publication No. 2016/0189092; U.S. Patent Application Publication No. 2016/0189284; U.S. Patent Application Publication No. 2016/0189288; U.S. Patent Application Publication No. 2016/0189366; U.S. Patent Application Publication No. 2016/0189443; U.S. Patent Application Publication No. 2016/0189447; U.S. Patent Application Publication No. 2016/0189489; U.S. Patent Application Publication No. 2016/0192051; U.S. Patent Application Publication No. 2016/0202951; U.S. Patent Application Publication No. 2016/0202958; U.S. Patent Application Publication No. 2016/0202959; U.S. Patent Application Publication No. 2016/0203021; U.S. Patent Application Publication No. 2016/0203429; U.S. Patent Application Publication No. 2016/0203797; U.S. Patent Application Publication No. 2016/0203820; U.S. Patent Application Publication No. 2016/0204623; U.S. Patent Application Publication No. 2016/0204636; U.S. Patent Application Publication No. 2016/0204638; U.S. Patent Application Publication No. 2016/0227912; U.S. Patent Application Publication No. 2016/0232891; U.S. Patent Application Publication No. 2016/0292477; U.S. Patent Application Publication No. 2016/0294779; U.S. Patent Application Publication No. 2016/0306769; U.S. Patent Application Publication No. 2016/0314276; U.S. Patent Application Publication No. 2016/0314294; U.S. Patent Application Publication No. 2016/0316190; U.S. Patent Application Publication No. 2016/0323310; U.S. Patent Application Publication No. 2016/0325677; U.S. Patent Application Publication No. 2016/0327614; U.S. Patent Application Publication No. 2016/0327930; U.S. Patent Application Publication No. 2016/0328762; U.S. Patent Application Publication No. 2016/0330218; U.S. Patent Application Publication No. 2016/0343163; U.S. Patent Application Publication No. 2016/0343176; U.S. Patent Application Publication No. 2016/0364914; U.S. Patent Application Publication No. 2016/0370220; U.S. Patent Application Publication No. 2016/0372282; U.S. Patent Application Publication No. 2016/0373847; U.S. Patent Application Publication No. 2016/0377414; U.S. Patent Application Publication No. 2016/0377417; U.S. Patent Application Publication No. 2017/0010141; U.S. Patent Application Publication No. 2017/0010328; U.S. Patent Application Publication No. 2017/0010780; U.S. Patent Application Publication No. 2017/0016714; U.S. Patent Application Publication No. 2017/0018094; U.S. Patent Application Publication No. 2017/0046603; U.S. Patent Application Publication No. 2017/0047864; U.S. Patent Application Publication No. 2017/0053146; U.S. Patent Application Publication No. 2017/0053147; U.S. Patent Application Publication No. 2017/0053647; U.S. Patent Application Publication No. 2017/0055606; U.S. Patent Application Publication No. 2017/0060316; U.S. Patent Application Publication No. 2017/0061961; U.S. Patent Application Publication No. 2017/0064634; U.S. Patent Application Publication No. 2017/0083730; U.S. Patent Application Publication No. 2017/0091502; U.S. Patent Application Publication No. 2017/0091706; U.S. Patent Application Publication No. 2017/0091741; U.S. Patent Application Publication No. 2017/0091904; U.S. Patent Application Publication No. 2017/0092908; U.S. Patent Application Publication No. 2017/0094238; U.S. Patent Application Publication No. 2017/0098947; U.S. Patent Application Publication No. 2017/0100949; U.S. Patent Application Publication No. 2017/0108838; U.S. Patent Application Publication No. 2017/0108895; U.S. Patent Application Publication No. 2017/0118355; U.S. Patent Application Publication No. 2017/0123598; U.S. Patent Application Publication No. 2017/0124369; U.S. Patent Application Publication No. 2017/0124396; U.S. Patent Application Publication No. 2017/0124687; U.S. Patent Application Publication No. 2017/0126873; U.S. Patent Application Publication No. 2017/0126904; U.S. Patent Application Publication No. 2017/0139012; U.S. Patent Application Publication No. 2017/0140329; U.S. Patent Application Publication No. 2017/0140731; U.S. Patent Application Publication No. 2017/0147847; U.S. Patent Application Publication No. 2017/0150124; U.S. Patent Application Publication No. 2017/0169198; U.S. Patent Application Publication No. 2017/0171035; U.S. Patent Application Publication No. 2017/0171703; U.S. Patent Application Publication No. 2017/0171803; U.S. Patent Application Publication No. 2017/0180359; U.S. Patent Application Publication No. 2017/0180577; U.S. Patent Application Publication No. 2017/0181299; U.S. Patent Application Publication No. 2017/0190192; U.S. Patent Application Publication No. 2017/0193432; U.S. Patent Application Publication No. 2017/0193461; U.S. Patent Application Publication No. 2017/0193727; U.S. Patent Application Publication No. 2017/0199266; U.S. Patent Application Publication No. 2017/0200108; and U.S. Patent Application Publication No. 2017/0200275.

Other Embodiments and Aspects

The foregoing detailed description and accompanying figures set forth typical embodiments of the devices, systems, and methods presently disclosed. The present disclosure is not limited to such exemplary embodiments. It will be apparent that numerous other devices, systems, and methods may be provided in accordance with the present disclosure. The present disclosure may utilize any variety of aspects, features, or steps, or combinations thereof which may be within the contemplation of those skilled in the art.

Various embodiments have been set forth via the use of block diagrams, flowcharts, and/or examples. Insofar as such block diagrams, flowcharts, and/or examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects and/or features of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of ordinary skill in the art in light of the present disclosure.

In addition, those skilled in the art will appreciate that some mechanisms of the subject matter described herein are capable of being distributed as a program product in a variety of forms, and that an illustrative embodiment of the subject matter described herein applies equally regardless of the signal bearing media used to carry out the distribution. Examples of a signal bearing media include, but are not limited to, the following: recordable type media such as volatile and non-volatile memory devices, floppy and other removable disks, hard disk drives, SSD drives, flash drives, optical discs (e.g., CD ROMs, DVDs, etc.), and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control elements (e.g., feedback for sensing temperature; control heaters for adjusting temperature). A typical data processing system may be implemented utilizing any suitable commercially available components, such as those typically found in data computing/communication and/or network computing/communication systems.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a functionality can be seen as "associated with" each other such that the desired functionality is achieved, irrespective of architectures or intermedial components. Likewise, any two components so associated can also be viewed as being "operably connected", or "operably coupled", to each other to achieve the desired functionality. Specific examples of operably couplable include but are not limited to physically mateable and/or physically interacting components and/or wirelessly interactable and/or wirelessly interacting components and/or logically interacting and/or logically interactable components.

The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those skilled in the art. The various aspects, features, and embodiments disclosed herein are for purposes of illustration and are not intended to be limiting. It is intended that the scope of the present disclosure be defined by the following claims and their equivalents:

The invention claimed is:

1. A removably couplable printer and verifier assembly, the removably couplable printer and verifier assembly comprising:
   a printer comprising a printer-coupling; and
   a verifier comprising: a verifier module comprising a verifier-coupling configured to interface with the printer-coupling, wherein the verifier module is configured to:
      provide a digital representation of print output of the printer; and
      compare the digital representation of the print output to an input image instructed by a print logic of the printer to verify the print output,
   wherein at least one of the verifier-coupling and/or the printer-coupling comprises one or more electromagnets configured to removably couple the verifier module to the printer at least in part by magnetic force acting between the verifier-coupling and the printer-coupling.

2. The removably couplable printer and verifier assembly of claim 1, wherein:
   the printer comprises:
      a printhead having an array of print elements configured to print sequential segments of an image on corresponding sequential segments of a print media, and
      a platen roller configured to advance the print media at a printing rate when printing the sequential segments,
      wherein the array of print elements are aligned substantially parallel to a lateral axis of the platen roller; and
   the verifier comprises an image sensor having an array of photo sensors configured to capture, as the digital representation of the print output of the printer, a representation of at least a portion of the sequential segments of the image having been printed on the print media as the platen roller advances the print media; and
   wherein the verifier module is removably coupled to a verifier receiving space of the printer, and wherein the magnetic force acting between the verifier-coupling and the printer-coupling operates to align the array of photo sensors to a fixed scanning position relative to the array of print elements.

3. The removably couplable printer and verifier assembly of claim 2, wherein the fixed scanning position comprises the array of photo sensors having a substantially parallel orientation to a lateral print axis corresponding to the array of print elements.

4. The removably couplable printer and verifier assembly of claim 3, wherein the fixed scanning position further comprises a photo sensor reference point corresponding to the array of photo sensors substantially aligned laterally with respect to a print axis reference point corresponding to the lateral print axis.

5. The removably couplable printer and verifier assembly of claim 4, wherein the fixed scanning position further comprises the photo sensor reference point positioned substantially at a fixed distance from a media support reference point corresponding to a media support of the printer, the fixed distance from the media support reference point providing space for advancing print media to move between the verifier module and the media support.

6. The removably couplable printer and verifier assembly of claim 2, wherein the verifier module comprises one or more protrusions and the verifier receiving space comprises one or more recesses corresponding to the one or more protrusions, each of the one or more protrusions being configured to fittingly mate with the respective one or more recesses.

7. The removably couplable printer and verifier assembly of claim 2, wherein the verifier module comprises the one or more magnets and the verifier receiving space comprises a magnetic material, the one or more magnets interacting with the magnetic material.

8. The removably couplable printer and verifier assembly of claim 2, wherein the verifier receiving space comprises the one or more magnets and the verifier module comprises a magnetic material, the one or more magnets interacting with the magnetic material.

9. The removably couplable printer and verifier assembly of claim 5, wherein the verifier module comprises a verifier-coupling magnetic array, and wherein the verifier receiving space comprises a printer-coupling magnetic array, and the magnetic force acting between the verifier-coupling magnetic array and the printer-coupling magnetic array being operable to align the array of photo sensors to the fixed scanning position.

10. The removably couplable printer and verifier assembly of claim 2, wherein the verifier module further comprises one or more verifier-fittings, and the verifier receiving space further comprises one or more printer-fittings, the one or more verifier-fittings and the one or more printer-fittings respectively configured to fittingly mate with one another, aiding alignment of the array of photo sensors to the fixed scanning position.

11. The printer assembly of claim 1, wherein:
the printer comprises a printhead having an array of print elements configured to print sequential segments of an image on corresponding sequential segments of a print media, and a platen roller configured to advance the print media when printing the sequential segments; and
the printer comprises a verifier receiving space configured to removably couple the verifier module to the printer, and wherein the magnetic force acting between the verifier-coupling and the printer-coupling operates to align an array of photo sensors of the verifier module to a fixed scanning position relative to the array of print elements.

12. A removably couplable verifier comprising:
a verifier module comprising a verifier-coupling configured to interface with a printer-coupling of a printer, wherein the verifier module is configured to:
provide a digital representation of print output of the printer; and
compare the digital representation of the print output to an input image instructed by a print logic of the printer to verify the print output,
the verifier-coupling comprising one or more electromagnets configured to removably couple the verifier module to the printer at least in part by magnetic force acting between the verifier-coupling and the printer-coupling.

13. The removably couplable verifier of claim 12, wherein the printer coupling comprises a magnetic metallic material, and wherein the one or more electromagnets of the verifier-coupling are further configured to interact with the magnetic metallic material.

14. The removably couplable verifier of claim 12, further comprising:
an image sensor having an array of photo sensors configured to capture, as the digital representation of the print output of the printer, a representation of at least a portion of sequential segments of an image printed on a print media;
wherein when the verifier module is removably coupled to the printer, the magnetic force acting between the verifier-coupling and the printer-coupling operates to align the array of photo sensors to a fixed scanning position relative to an array of print elements of the printer.

15. The removably couplable verifier of claim 12, wherein the verifier module further comprises one or more protrusions configured to fittingly mate with respective one or more recesses defined in a verifier receiving space of the printer.

16. The removably couplable verifier of claim 14, wherein the verifier module further comprises one or more verifier-fittings configured to fittingly mate with respective one or more printer-fittings of a verifier receiving space of the printer, aiding alignment of the array of photo sensors to the fixed scanning position.

17. A printer assembly comprising:
a printer comprising a printer-coupling;
the printer-coupling configured to interface with a verifier-coupling of a verifier module of a verifier, wherein the verifier module is configured to:
provide a digital representation of print output of the printer; and
compare the digital representation of the print output to an input image instructed by a print logic of the printer to verify the print output,
the printer-coupling comprising one or more electromagnets configured to removably couple the verifier module to the printer at least in part by magnetic force acting between the verifier-coupling and the printer-coupling.

18. The printer assembly of claim 17, wherein the verifier-coupling comprises a metallic material, and wherein the one or more electromagnets of the printer-coupling interact with the metallic material of the verifier-coupling.

19. The printer assembly of claim 18, further comprising a housing defining a verifier receiving space, wherein the verifier receiving space comprises one or more recesses corresponding to one or more protrusions of the verifier module, each of the one or more recesses being configured to fittingly mate with the respective one or more protrusions.

20. The printer assembly of claim 18, further comprising a housing defining a verifier receiving space, wherein the verifier receiving space further comprises one or more printer-fittings configured to fittingly mate with one or more verifier-fittings of the verifier module, aiding alignment of the array of photo sensors to the fixed scanning position.

\* \* \* \* \*